United States Patent
Lee

(10) Patent No.: US 10,360,295 B2
(45) Date of Patent: Jul. 23, 2019

(54) DEVICE AND METHOD FOR EDITING TEXT IN PORTABLE TERMINAL

(71) Applicant: Samsung Electronics Co., Ltd., Suwon-si, Gyeonggi-do (KR)

(72) Inventor: Chang-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 14/181,093

(22) Filed: Feb. 14, 2014

(65) Prior Publication Data

US 2014/0229165 A1 Aug. 14, 2014

(30) Foreign Application Priority Data

Feb. 13, 2013 (KR) .................. 10-2013-0015485

(51) Int. Cl.
*G06F 17/24* (2006.01)
*G06F 17/21* (2006.01)
*G06F 17/20* (2006.01)
*G06F 3/0486* (2013.01)
(Continued)

(52) U.S. Cl.
CPC ............ *G06F 17/24* (2013.01); *G06F 3/0486* (2013.01); *G06F 3/04883* (2013.01); *H04M 1/72552* (2013.01); *H04M 2250/70* (2013.01)

(58) Field of Classification Search
CPC .... G06F 3/04883; G06F 17/24; G06F 3/0486; G06F 3/0482; G06F 17/21; G06F 17/30011; G06F 17/273; G06F 2203/04803; G06F 2203/04808; G06F 17/211; G06F 17/212; G06F 17/218; G06F 17/241

USPC ...... 704/1–10; 715/234, 769, 205, 255, 257, 715/763, 764, 770; 345/173
See application file for complete search history.

(56) References Cited

U.S. PATENT DOCUMENTS 5,666,139 A * 9/1997 Thielens ................. G06F 17/24
345/173
2006/0149825 A1 7/2006 Kim
2007/0186158 A1 8/2007 Kim et al.
(Continued)

FOREIGN PATENT DOCUMENTS

CN 101601050 A 12/2009
CN 101925894 A 12/2010
(Continued)

OTHER PUBLICATIONS

Document Compare Tool for Microsoft Word—DiffDog 2013, Oct. 22, 2012, XP055326665, Altova, URL: https://web.archive.org/web/20121022150839/http://www.altova.com/diffdog/word-document-comparison.html.
(Continued)

*Primary Examiner* — Dwayne D Bost
*Assistant Examiner* — Stephen M Brinich
(74) *Attorney, Agent, or Firm* — Jefferson IP Law, LLP

(57) ABSTRACT

A device and a method for editing text in a portable terminal are provided. The device includes displaying content comprising at least one unit of text, receiving an input of at least one unit of text through a first display area, changing to an editing mode for editing the content when the input text is released from the first display area while dragging the input text to replace a specific word included in the content located at a second display area, and replacing the specific word with the input text when the input text is completely dragged to the specific word.

10 Claims, 16 Drawing Sheets

(51) Int. Cl.
*G06F 3/0488* (2013.01)
*H04M 1/725* (2006.01)

(56) References Cited

U.S. PATENT DOCUMENTS

| | | |
|---|---|---|
| 2009/0189862 A1 | 7/2009 | Viberg |
| 2010/0211860 A1 | 8/2010 | O'Dell-Alexander |
| 2010/0235726 A1 | 9/2010 | Ording et al. |
| 2010/0235729 A1 | 9/2010 | Kocienda et al. |
| 2010/0287486 A1 | 11/2010 | Coddington |
| 2012/0272143 A1* | 10/2012 | Gillick .................. G06Q 10/10 715/256 |
| 2013/0014054 A1 | 1/2013 | Choi et al. |
| 2014/0078559 A1* | 3/2014 | Wu .......................... G06K 9/00 358/452 |
| 2014/0111516 A1* | 4/2014 | Hall ...................... G06F 17/212 345/428 |

FOREIGN PATENT DOCUMENTS

| | | |
|---|---|---|
| CN | 102981750 A | 3/2013 |
| KR | 10-2002-0078526 A | 10/2002 |
| KR | 10-0595709 B1 | 6/2006 |
| KR | 10-2007-0080879 A | 8/2007 |
| WO | 2008/133619 A2 | 11/2008 |

OTHER PUBLICATIONS

Bradford, TextMaker for Android Offers True Track Changes Functionality on Phones and Tablets, Sep. 19, 2011, XP055326518, URL: http://www.gottabemobile.com/2011/09/19/textmaker-for-android-track-changes-hands-on/.
Kaleidoscope—File Comparison for Mac, Feb. 2, 2013, XP055326531, Black Pixel, URL: https://web.archive.org/web/20130202012917/http://www.kaleidoscopeapp.com/.

* cited by examiner

DEVICE AND METHOD FOR EDITING TEXT IN PORTABLE TERMINAL

CROSS-REFERENCE TO RELATED APPLICATION(S)

This application claims the benefit under 35 U.S.C. § 119(a) of a Korean patent application filed on Feb. 13, 2013 in the Korean Intellectual Property Office and assigned Serial No. 10-2013-0015485, the entire disclosure of which is hereby incorporated by reference.

TECHNICAL FIELD

The present disclosure relates to a portable terminal. More particularly, the present disclosure relates to a device and a method for editing text in a portable terminal.

BACKGROUND

In general, portable terminals including a smart phone and a tablet Personal Computer (PC) provide diverse useful functions to a user through a variety of applications. The portable terminals are changing to a device that can use various types of information to provide diverse functions including a voice call function. In particular, the portable terminals provide an editing function for editing content including text.

The portable terminals providing an editing function can edit a word included in the content. Particularly, in order to edit a specific word included in the content, the portable terminals receive a selection of the specific word in the content, erase the specific word according to a user request, and receive from a user, an input of another word that will replace the erased specific word. However, in the above-described editing method, the specific word is edited through various operations including receiving the selection of the specific word, erasing the specific word, and receiving the input of the new word, thereby inconveniencing a user.

Thus, a new editing method that can provide convenience for a user is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method for editing text in a portable terminal, wherein the text can be edited through a drag function of a touch screen in a portable terminal.

Another aspect of the present disclosure is to provide a device and a method for editing text in a portable terminal, wherein a word can be changed through a drag function of a touch screen in a portable terminal.

Another aspect of the present disclosure is to provide a device and a method for editing text in a portable terminal, wherein a sentence can be changed through a drag function of a touch screen in a portable terminal.

Another aspect of the present disclosure is to provide a device and a method for editing text in a portable terminal, wherein a word can be erased through a drag function of a touch screen in a portable terminal.

In accordance with an aspect of the present disclosure, a device for editing text in a portable terminal is provided. The device includes a display unit, and a controller that displays content including at least one unit of text on the display unit, receives an input of at least one unit of text through a first display area, changes to an editing mode for editing the content, when the input text is released from the first display area while dragging the input text to replace a specific word included in the content located at a second display area, and replaces the specific word with the input text when the input text is completely dragged to the specific word.

In accordance with another aspect of the present disclosure, a method of editing text in a portable terminal is provided. The method includes displaying content including at least one unit of text, receiving an input of at least one unit of text through a first display area, changing to an editing mode for editing the content, when the input text is released from the first display area while dragging the input text to replace a specific word included in the content located at a second display area, and replacing the specific word with the input text when the input text is completely dragged to the specific word.

As described above, an aspect of the present disclosure is to provide a device and a method for editing text in a portable terminal, in which the text can be edited through a drag function of a touch screen in a portable terminal, thereby making a user conveniently edit the text.

In accordance with an aspect of the present disclosure, a word can be changed through a drag function of a touch screen in a portable terminal, thereby making a user conveniently change the word.

In accordance with another aspect of the present disclosure, a sentence can be changed through a drag function of a touch screen in a portable terminal, thereby making a user conveniently change the sentence.

In accordance with another aspect of the present disclosure, a word can be erased through a drag function of a touch screen in a portable terminal, thereby making a user conveniently erase the word.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminal according to the embodiment of the present disclosure includes a portable terminal and a fixed terminal. Here, the portable terminal is an electronic device that is movable to be easily carried, which may be, for example, a video phone, a mobile phone, a smart phone, an IMT-2000 (International Mobile Telecommunication 2000) terminal, a WCDMA terminal, a UMTS (Universal Mobile Telecommunication Service) terminal, a PDA (Personal Digital Assistant), a PMP (Portable Multimedia Player), a DMB (Digital Multimedia Broadcasting) terminal, an E-Book, a portable computer (for example, a notebook computer or a tablet computer), or a digital camera.

Figure 1:
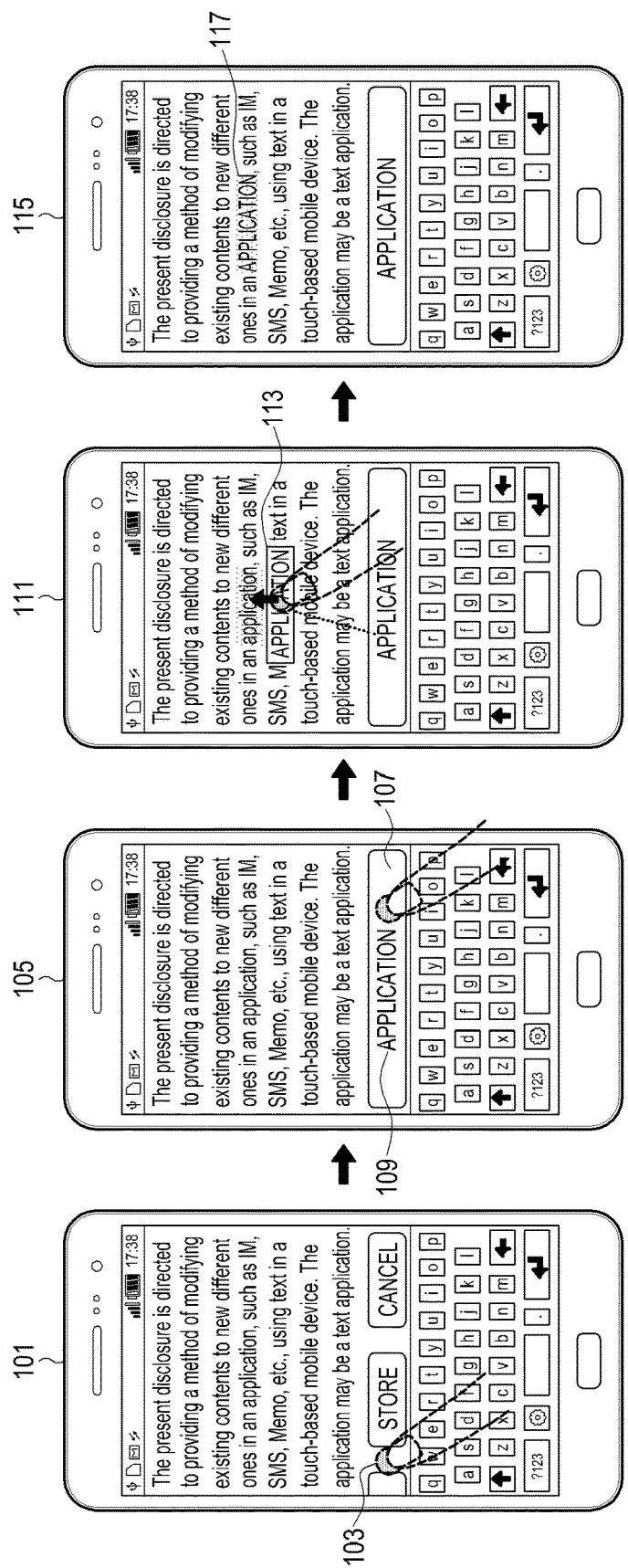
FIG. 1 illustrates a process of changing a word of an electronic document in a portable terminal according to an embodiment of the present disclosure.

FIG. 1 illustrates a process of changing a word of an electronic document in a portable terminal according to an embodiment of the present disclosure.

Referring to FIG. 1, as displayed on a screen 101, when receiving from a user a request for displaying an electronic document, the portable terminal displays the requested electronic document, and determines whether the user selects a virtual key 103 to request editing of the electronic document. The virtual key 103 is located at a predetermined area on the screen, and when the user touches the virtual key 103, the portable terminal determines that the user has requested the editing of the electronic document.

When it is determined that the user has selected the virtual key 103, the portable terminal displays an editing window 107, and determines whether the user selects at least one character through a keypad, as displayed on a screen 105. When it is determined that the user has selected at least one character, the portable terminal displays the selected at least one character 109 in the editing window 107. For example, the portable terminal may display 'APPLICATION' 109 in the editing window 107 when 'a', 'p', 'p', 'l', 'i', 'c', 'a', 't', 'i', 'o', and 'n' are selected through the keypad.

As displayed on a screen 111, when the user drags the word 113 displayed in the editing window 107 to a location of any specific word among a plurality of words included in the electronic document, the portable terminal displays the specific word with a specific color (e.g., yellow) to inform the user of a word that can be changed with the word 113. For example, when the word 'APPLICATION' being dragged is located on a word 'application', the portable terminal may display the word 'application' in yellow.

As displayed on a screen 115, when the word 113 is dragged and dropped to a location of the specific word, the portable terminal changes the specific word with the dragged word 113. For example, when the word 113 is dragged to a display location of the specific word and dragging completion event is generated at the display location of the specific word, the portable terminal replaces the specific word with the word 113. For example, when a touch on the word 'APPLICATION' being dragged is released while the word 'APPLICATION' is located on the word 'application' 117, the portable terminal may change the word 'application' 117 with the word 'APPLICATION'.

When the user touches the virtual key 103 again after an editing mode for editing the electronic document is completed and the editing window 107 is closed, the portable terminal may display the editing window 107 and the at least one character previously input in the editing window 107. For example, in a case where the previously input word is 'APPLICATION', the portable terminal may display the editing window including the word 'APPLICATION' when the user touches the virtual key 103 again.

Figure 2:
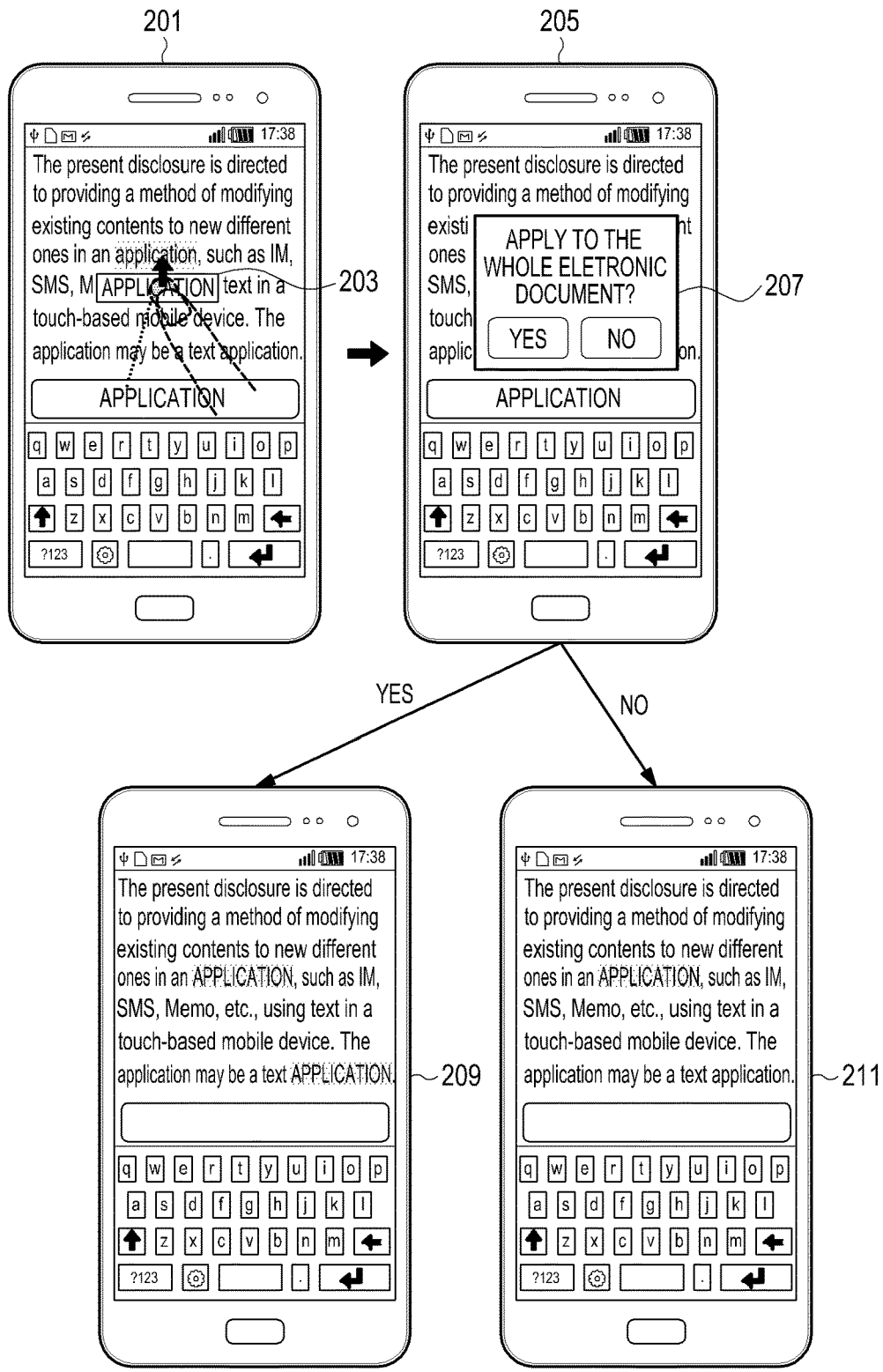
FIG. 2 illustrates a process of applying a word to an electronic document in a portable terminal according to an embodiment of the present disclosure.

FIG. 2 illustrates a process of applying a word to an electronic document in a portable terminal according to an embodiment of the present disclosure.

Referring to FIG. 2, as displayed on a screen 201, when a word 203 is dragged and dropped to a location of a specific word, the portable terminal changes the specific word with the dragged word 203. For example, when a touch on the word 'APPLICATION' being dragged is released while the word 'APPLICATION' is located on a word 'application', the portable terminal may change the word 'application' with the word 'APPLICATION'.

As displayed on a screen 205, when there are the same specific words as the changed word in the electronic document, the portable terminal displays a message for inquiring as to whether all the same specific words as the changed word in the electronic document are to be changed with the dragged word 203. For example, the portable terminal displays a pop-up window 207 including the text 'Apply to the whole electronic document?' for an inquiry message, and words 'Yes' and 'No' for a user determination.

When a user makes a request to apply the change to the whole electronic document, the portable terminal changes at least one of all the same specific words included in the electronic document with the dragged word, as displayed on a screen 209. For example, in a case where the specific word is 'application'' and an input word is 'APPLICATION', the portable terminal may change all the same specific words 'application', included in the electronic document, with the input word 'APPLICATION'. And the replacement of a word may be applied two words, even if languages corresponding to the tow words are different. For example, a first word may be Korean and a second word may be English.

On the other hand, when the user refuses to apply the change to the whole electronic document, the portable terminal does not change the same specific words as the changed word, included in the electronic document, with the dragged word, and maintains the same specific words as they are, as displayed on a screen 211.

Figure 3:
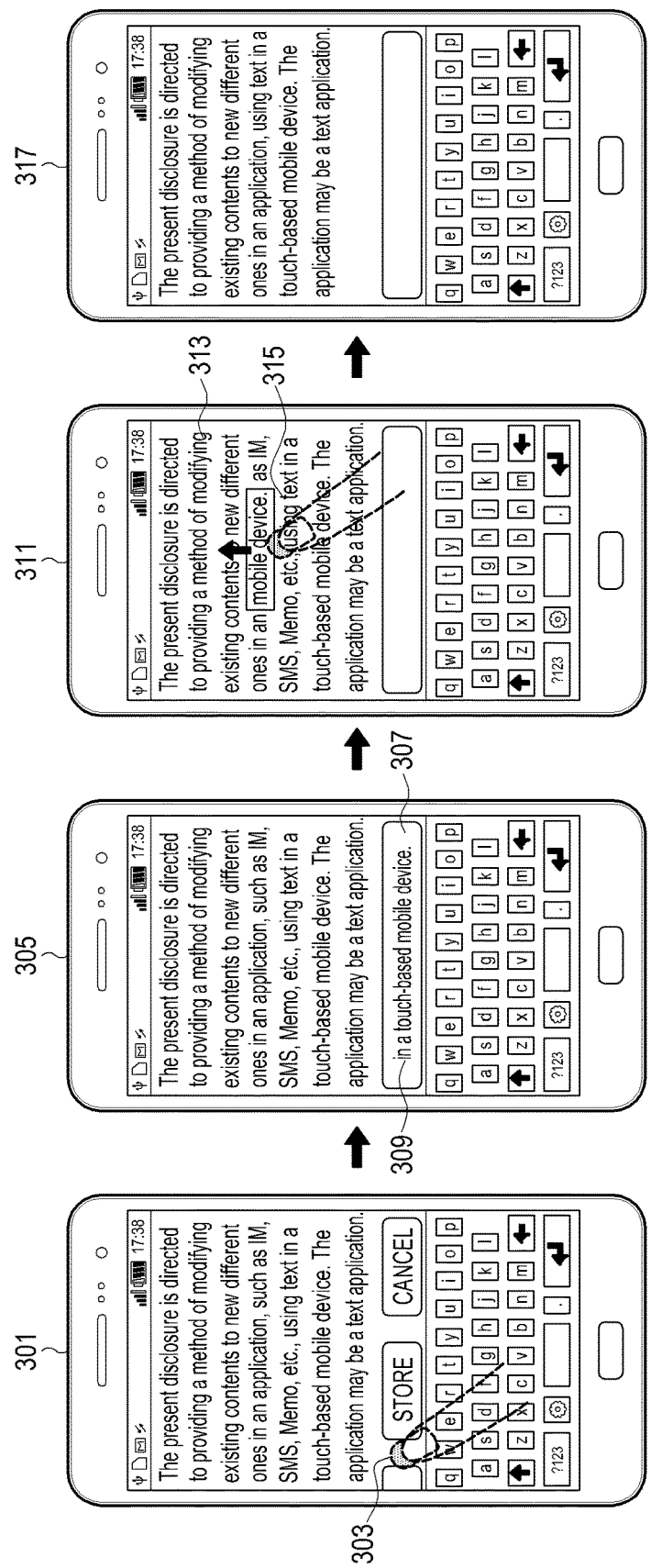
FIG. 3 illustrates a process of changing a sentence of an electronic document in a portable terminal according to an embodiment of the present disclosure.

FIG. 3 illustrates a process of changing a sentence of an electronic document in a portable terminal according to an embodiment of the present disclosure.

Referring to FIG. 3, as displayed on a screen 301, when receiving from a user a request for displaying an electronic document, the portable terminal displays the corresponding electronic document, and determines whether the user selects a virtual key 303 to request editing of the electronic document. The virtual key 303 is located at a predetermined area on the screen, and when the user touches the virtual key 303, the portable terminal determines that the user has requested the editing of the electronic document.

When it is determined that the user has selected the virtual key 303, the portable terminal displays an editing window 307, and determines whether the user selects at least one character through a keypad, as displayed on a screen 305. When it is determined that the user has selected at least one character, the portable terminal displays the at least one character selected in the editing window 307. For example, the portable terminal may display in the editing window 307 a sentence 309 'The present disclosure is directed to providing a method of modifying existing contents to new different ones in an application using text in a touch-based mobile device.'.

As displayed on a screen 311, when the user drags the sentence 315 displayed in the editing window 307 to a location of any specific sentence 313 among a plurality of sentences included in the electronic document, the portable terminal displays the specific sentence 313 with a specific color (e.g., yellow) in order to inform the user of a sentence that can be changed with the sentence 315 being dragged. For example, when the sentence 315 being dragged 'The present disclosure is directed to providing a method of modifying existing contents to new different ones in an application using text in a touch-based mobile device.' is located on a sentence 'The present disclosure is to provide a method of modifying a typing error when the typing error is made in a text-based application such as IM, SMS, Memo, etc., in a touch-based mobile device.', the portable terminal may display the sentence 'The present disclosure is to provide a method of modifying a typing error when the typing error is made in a text-based application such as IM, SMS, Memo, etc., in a touch-based mobile device.' in yellow.

As displayed on a screen 317, when the sentence 315 is dragged and dropped to a location of the specific sentence 313, the portable terminal changes the specific sentence 313 with the dragged sentence 315. For example, when the sentence 315 is dragged to a display location of the specific sentence 313 and dragging completion event is generated at the display location of the specific sentence 313, the portable terminal replaces the specific sentence 313 with the sentence 315. For example, when a touch on the sentence 315 being dragged is released while the sentence 315 'The present disclosure is directed to providing a method of modifying existing contents to new different ones in an application using text in a touch-based mobile device.' is located on the specific sentence 313 'The present disclosure is to provide a method of modifying a typing error when the typing error is made in a text-based application such as IM, SMS, Memo in a touch-based mobile device.', the portable terminal may change the specific sentence 313 'The present disclosure is to provide a method of modifying a typing error when the typing error is made in a text-based application such as IM, SMS, Memo in a touch-based mobile device.' with the dragged sentence 'The present disclosure is directed to providing a method of modifying existing contents to new different ones in an application using text in a touch-based mobile device.'.

Figure 4:
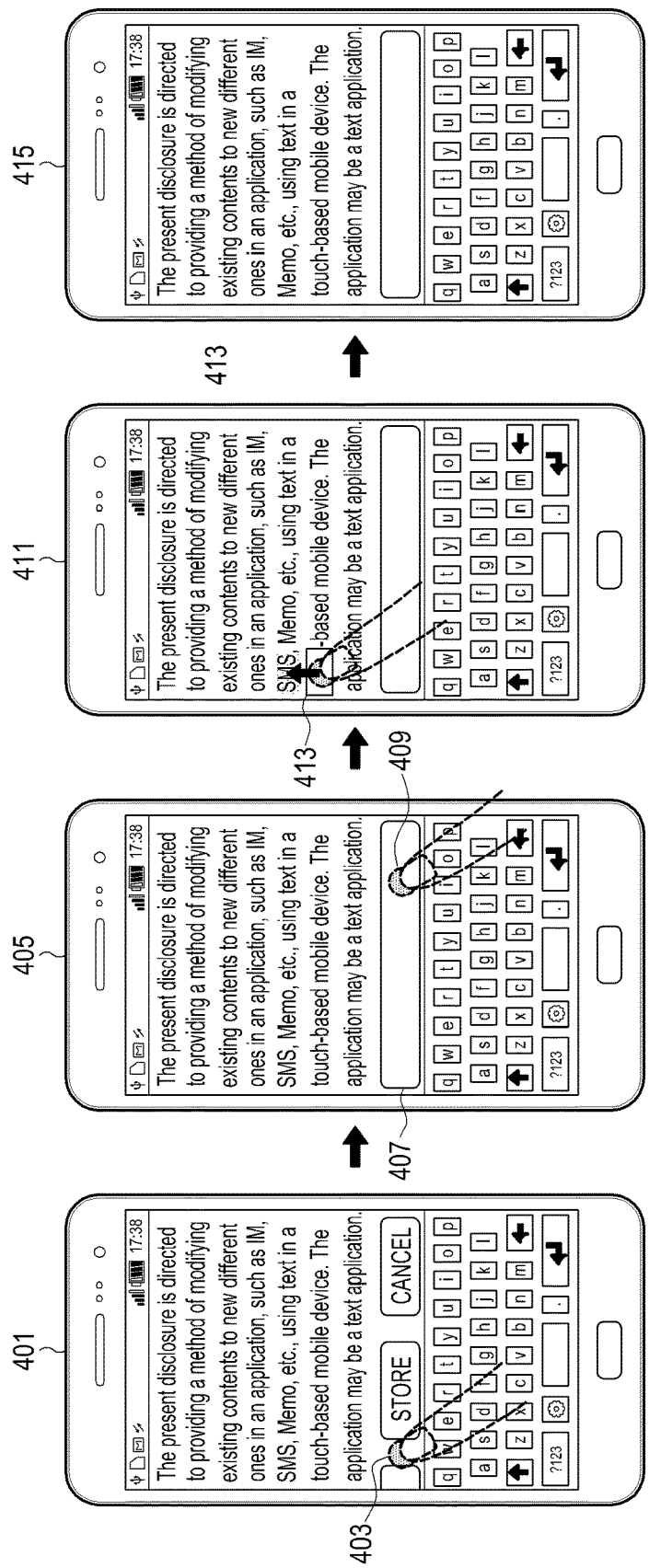
FIG. 4 illustrates a process of erasing a word of an electronic document in a portable terminal according to an embodiment of the present disclosure.

FIG. 4 illustrates a process of erasing a word of an electronic document in a portable terminal according to an embodiment of the present disclosure.

Referring to FIG. 4, as displayed on a screen 401, when receiving from a user a request for displaying an electronic document, the portable terminal displays the requested electronic document, and determines whether the user selects a virtual key 403 to request editing of the electronic document. The virtual key 403 is located at a predetermined area on the screen, and when the user touches the virtual key 403, the portable terminal determines that the user has requested the editing of the electronic document. When it is determined that the user has selected the virtual key 103, the portable terminal displays an editing window 407 as displayed on a screen 405, and determines whether the user requests a drag of a blank field in the editing window 407.

When it is determined that the user has requested the drag of the blank field in the editing window 407, the portable terminal determines that the user has requested erasing of a word, and, as displayed on a screen 411, displays an empty area 413 where no character is recorded. The empty area 413 has a predetermined size, and is moved according to the drag operation of the user. When the user drags the empty area 413 to a location of any specific word among a plurality of words included in the electronic document, the portable terminal displays the specific word with a specific color (e.g., green) to inform the user of an erasable word. For example, when the empty area 413 is located on a word 'SMS', the portable terminal may display the word 'SMS' in green.

As displayed on a screen 415, when the empty area 413 is dragged and dropped to a location of the specific word, the portable terminal erases the specific word. For example, when the empty area 413 is dragged to a display location of the specific word and dragging completion event is generated at the display location of the specific word, the portable terminal replaces the specific word with the empty area 413. For example, when a touch on the empty area 413 is released while the empty area 413 is located on a word 'SMS', the portable terminal may erase the word 'SMS'.

Figure 5:
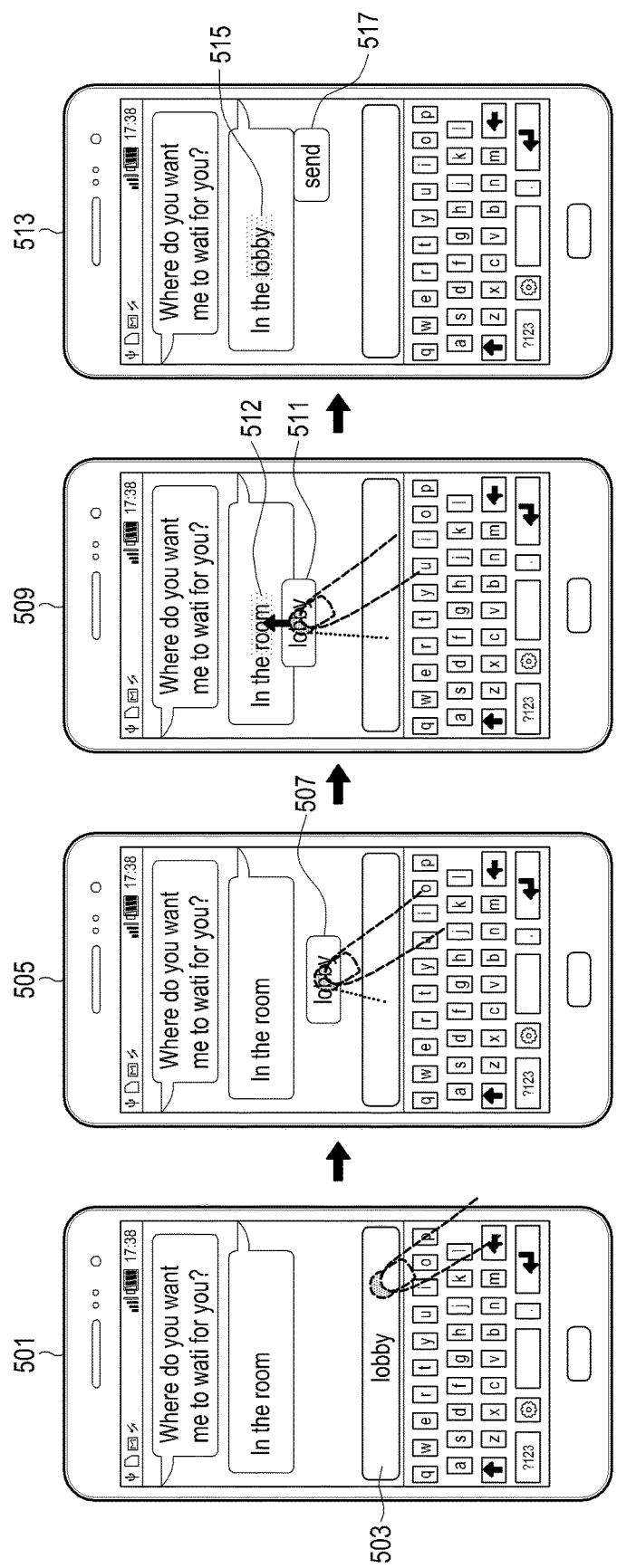
FIG. 5 illustrates a process of changing an English word of a message in a portable terminal according to an embodiment of the present disclosure.

FIG. 5 illustrates a process of changing an English word of a message in a portable terminal according to an embodiment of the present disclosure.

Referring to FIG. 5, as displayed on a screen 501, the portable terminal displays a corresponding text message when receiving from a user a request for displaying the text message and an editing window 503 when receiving from the user a request for editing the text message, and determines whether the user selects at least one character through a keypad. When it is determined that the user has selected at least one character, the portable terminal displays the selected character in the editing window 503. For example, the portable terminal may display 'lobby' in the editing window 503 when 'l', 'o', 'b', 'b', and 'y' are selected through the keypad.

When the user drags the word 507 displayed in the editing window 503 as displayed on a screen 505 so that the word 511 being dragged is located on any specific word among a plurality of specific words included in a text message as displayed on a screen 509, the portable terminal displays the specific word with a specific color (e.g., yellow) to inform the user of a word that can be changed with the dragged word 511. For example, when the word 'lobby' being dragged is located on a word 'room' 512, the portable terminal may display the word 'room' 512 with in yellow.

As displayed on a screen 513, when the word 511 is dragged and dropped to a location of the specific word 515, the portable terminal changes the specific word with the dragged word 511, and displays a bubble 517 for inquiring the user as to whether a new message including the changed word 511 is to be sent. For example, when the word 511 is dragged to a display location of the specific word 515 and dragging completion event is generated at the display location of the specific word 515, the portable terminal replaces the specific word 515 with the word 511. For example, when a touch on the dragged word 'lobby' is released while the word 'lobby' 511 being dragged is located on the word 'room' 512, the portable terminal may change the word 'room' 512 with the dragged word 'lobby'.

Figure 6A:
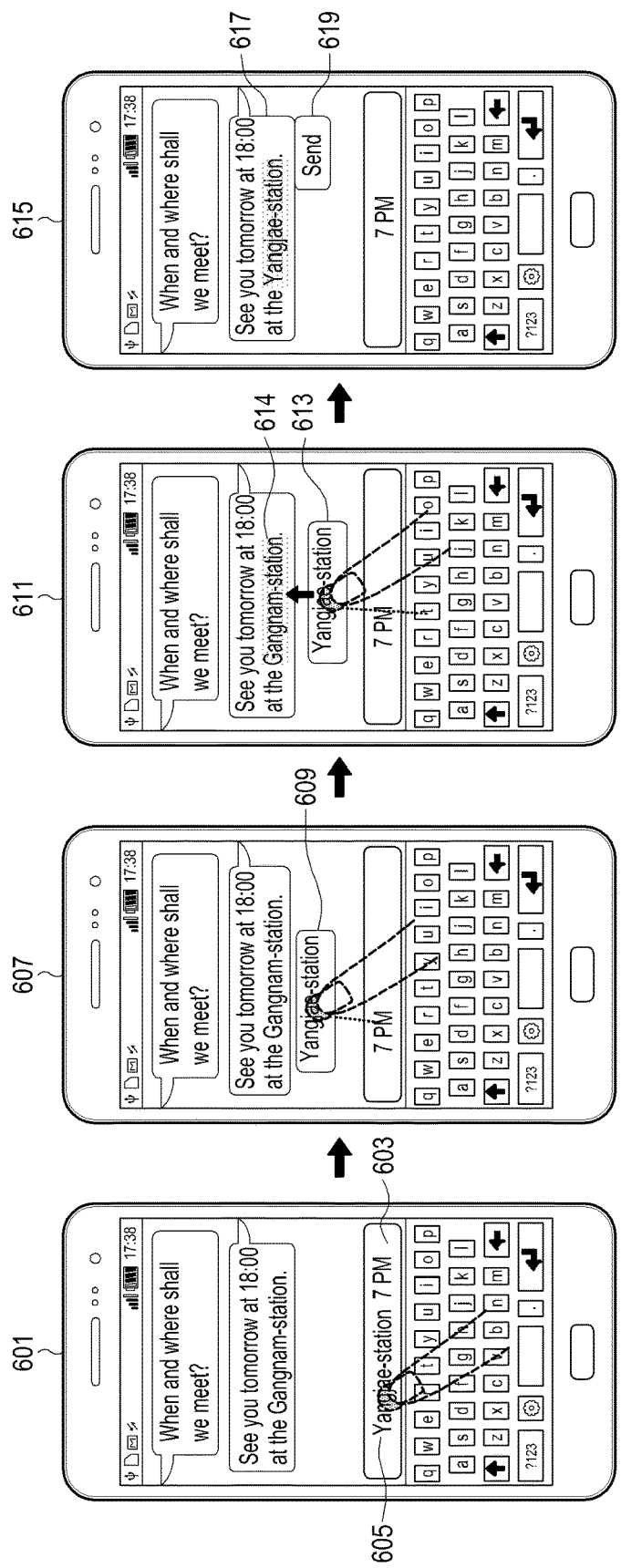
FIGS. 6A and 6B illustrate a process of changing a word of a message in a portable terminal according to an embodiment of the present disclosure.
Figure 6B:
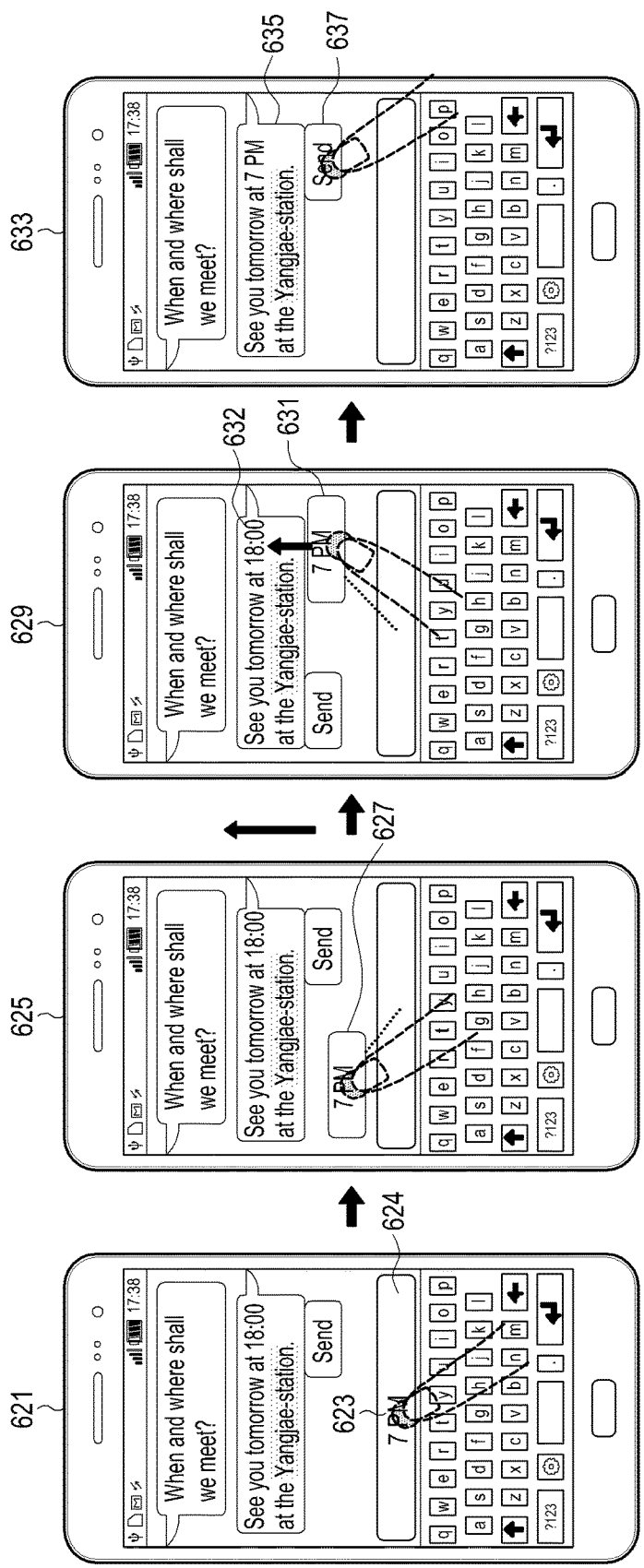

FIGS. 6A and 6B illustrate a process of changing a word of a message in a portable terminal according to an embodiment of the present disclosure.

Referring to FIGS. 6A and 6B, as displayed on a screen 601, the portable terminal displays a corresponding text message when receiving from a user a request for displaying the text message and an editing window 603 when receiving from the user a request for editing a text message, and determines whether the user selects at least one character through a keypad. When it is determined that the user has selected at least one character, the portable terminal displays the selected character in the editing window 603. For example, the portable terminal may display two words 'Yangjae-station' and '7 PM' in the editing window 603.

When the user drags a first word 609 among a plurality of words displayed in the editing window 603 as displayed on a screen 607 so that the first word being dragged is located on any specific word included in a text message as displayed on a screen 611, the portable terminal displays to the user a word, which can be changed with the first word being dragged, with a specific color (e.g., yellow). For example, when the word 'Yangjae-station' 613 being dragged is located on a word 'Gangnam-station' 614, the portable terminal may display the word 'Gangnam-station' 614 in yellow.

As displayed on a screen 615, when the first word 613 is dragged and dropped to a location of the specific word, the portable terminal changes the specific word with the dragged first word 613, and displays a bubble 619 for inquiring the user as to whether the changed message 617 including the first word 613 is to be sent. For example, when the first word 613 is dragged to a display location of the specific word and dragging completion event is generated at the display location of the specific word, the portable terminal replaces the specific word with the first word 613. For example, when a touch on the word 'Yangjae-station' 613 being dragged is released while the word 'Yangjae-station' 613 is located on the word 'Gangnam-station' 614, the portable terminal may change the word 'Gangnam-station' 614 with the word 'Yangjae-station' 613.

As displayed on a screen 621, the portable terminal determines whether the user requests a drag of a second word 623 among the plurality of words displayed in the editing window 624. When it is determined that the user has requested the drag of the second word 623, the portable terminal drags the second word 627 as displayed on a screen 625.

As displayed on a screen 629, when the second word 631 is dragged to be located on any specific word among a plurality of words included in a text message, the portable terminal displays the specific word with a specific color (e.g., yellow) in order to inform the user of a word that can be changed with the second word 631 being dragged. For example, when the word '7 PM' 631 being dragged is located on the word '18:00' 632, the portable terminal may display the word '18:00' 632 in yellow.

As displayed on a screen 633, when the second word 631 is dragged and dropped to a location of the specific word, the portable terminal changes the specific word with the dragged second word 631, and displays a bubble 637 for inquiring the user as to whether the changed message 635 including the changed word 627 is to be sent. For example, when a touch on the word '7 PM' 631 being dragged is released while the word '7 PM' 631 is located on the word '18:00' 632, the portable terminal may change the word '18:00' 632 with the word '7 PM' 631.

The portable terminal determines whether the user touches the bubble 637, and transmits the changed message 635 to a portable terminal of a recipient when it is determined that the user has touched the bubble 637.

Figure 7:
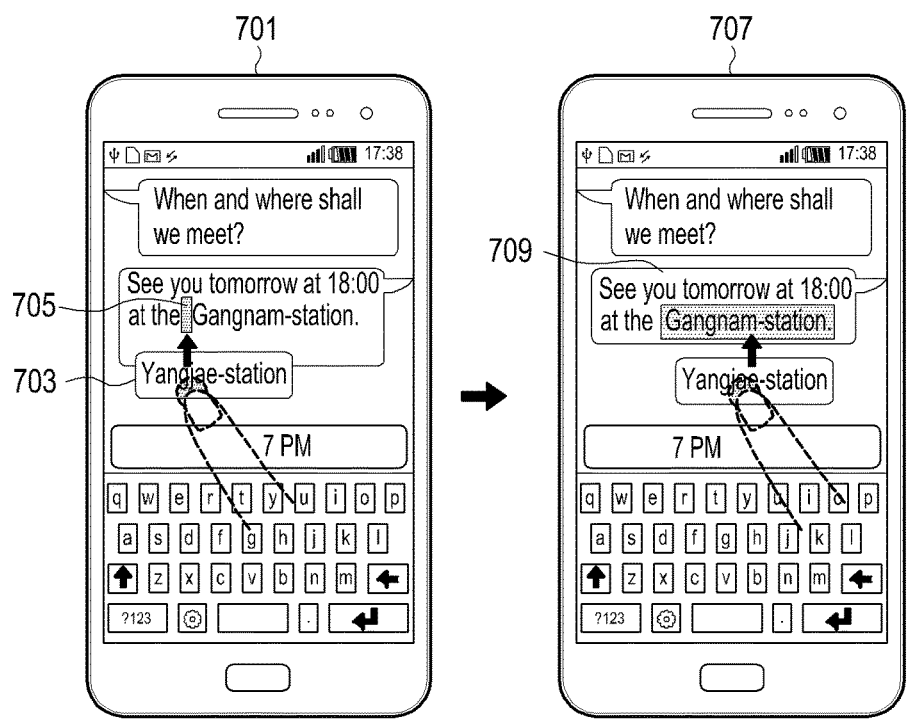
FIG. 7 illustrates a process of selecting a word to be changed in a portable terminal according to an embodiment of the present disclosure.

FIG. 7 illustrates a process of selecting a word to be changed in a portable terminal according to an embodiment of the present disclosure.

Referring to FIG. 7, when a user drags a specific word among a plurality of words included in a text message while dragging a specific word displayed in an editing window, the portable terminal displays the dragged specific word included in the text message with a specific color (e.g., yellow) so that the user may select a word that will be changed.

As displayed on a screen 701, the portable terminal determines whether the user drags the specific word among the plurality of words included in the text message, in order to receive from the user a selection of a word that will be changed with a word 'Yangjae-station' 703. For example, the user may drag a word 'Gangnam-station' 705 among the plurality of words included in the text message.

When it is determined that the specific word has been dragged and a touch on the dragged word has been released, the portable terminal changes the specific word included in the text message with the word input by the user. For example, as displayed on a screen 707 in the message 709, when the word 'Gangnam-station' 705 is dragged and then a touch on the word is released, the portable terminal may change the word 'Gangnam-station' 705 with the word 'Yangjae-station' 703 in the message 709.

Figures 8A, 8B:
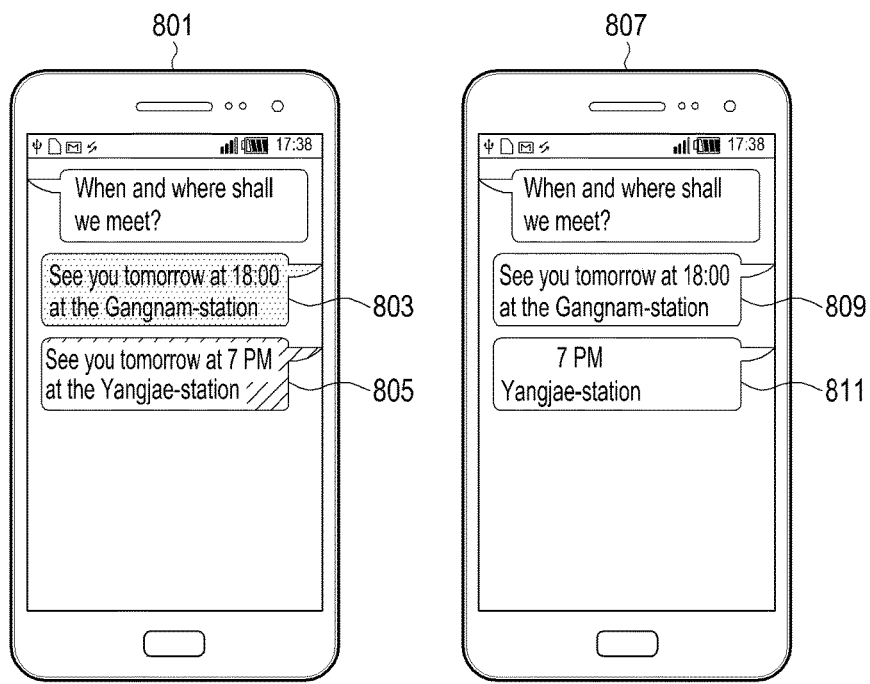
FIGS. 8A and 8B illustrate screens for displaying both an original message and a changed message in a portable terminal according to an embodiment of the present disclosure.

FIGS. 8A and 8B illustrate screens for displaying both an original message and a changed message in a portable terminal according to an embodiment of the present disclosure.

Referring to FIGS. 8A and 8B, when a user touches the bubble 637 (see FIG. 6B) for requesting transmission of a text message as displayed on the screen 633, the portable terminal displays a changed message together with an original message according to predetermined message displaying methods.

More specifically, as displayed on a screen 801, when displaying the original message 803 and the changed message 805 according to a first displaying method among the predetermined message displaying methods, the portable terminal displays, in different colors, an original message 803 and a first changed message 805 in which at least one word included in the original message is changed. For example, the portable terminal may display the original message 803 'See you tomorrow at 18:00 at the Gangnam-station' in black, and the first changed message 805 'See you tomorrow at 7 PM at Yangjae-station' in red.

Alternatively, the portable terminal may display the original message 803 with a specific color, and the first changed message 805 with another specific color that is the same as but lighter than that of the original message. For example, the portable terminal may display the original message 803 'See you tomorrow at 18:00 at the Gangnam-station' in a dark red, and the first changed message 805 'See you tomorrow at 7 PM at the Yangjae-station' with a red lighter than the dark red.

As displayed on a screen 807, when displaying the original message and the changed message according to a second displaying method among the predetermined message displaying methods, the portable terminal displays an original message 809 and a second changed message 811 including only at least one changed word. At this time, the portable terminal arranges the at least one changed word, included in the second changed message 811, at the same location as that of at least one original word included in the original message 809. For example, when the original message 809 is 'See you tomorrow at 18:00 at the Gangnam-station' and changed words are '7 PM' and 'Yangjae-station', the portable terminal may display the second changed message 811 '7 PM Yangjae-station'.

Figure 9A:
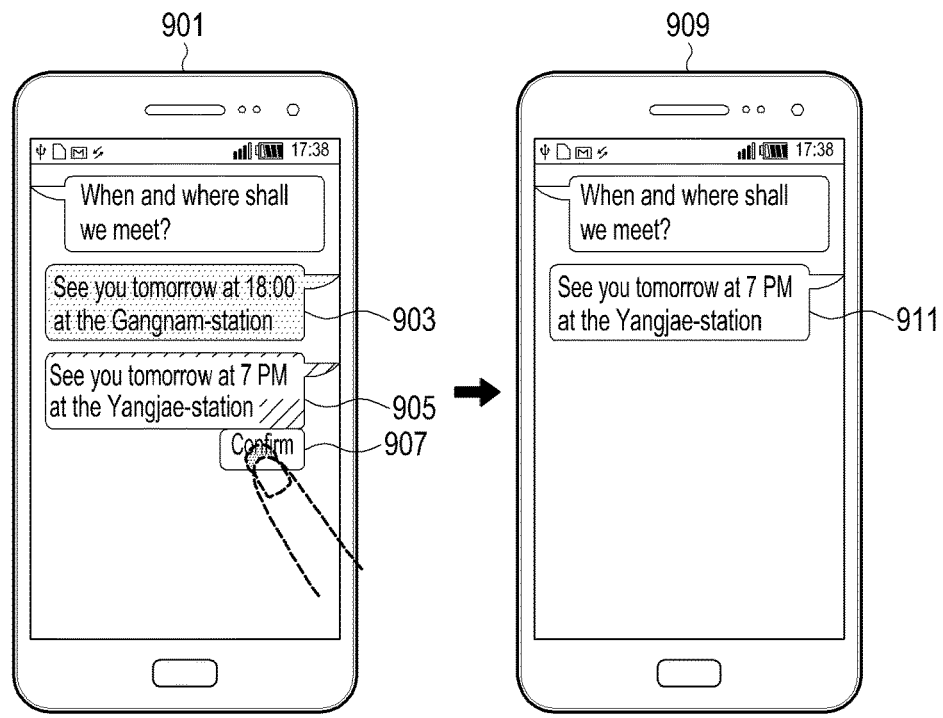
FIGS. 9A and 9B illustrate processes of erasing an original message in a portable terminal according to an embodiment of the present disclosure.
Figure 9B:
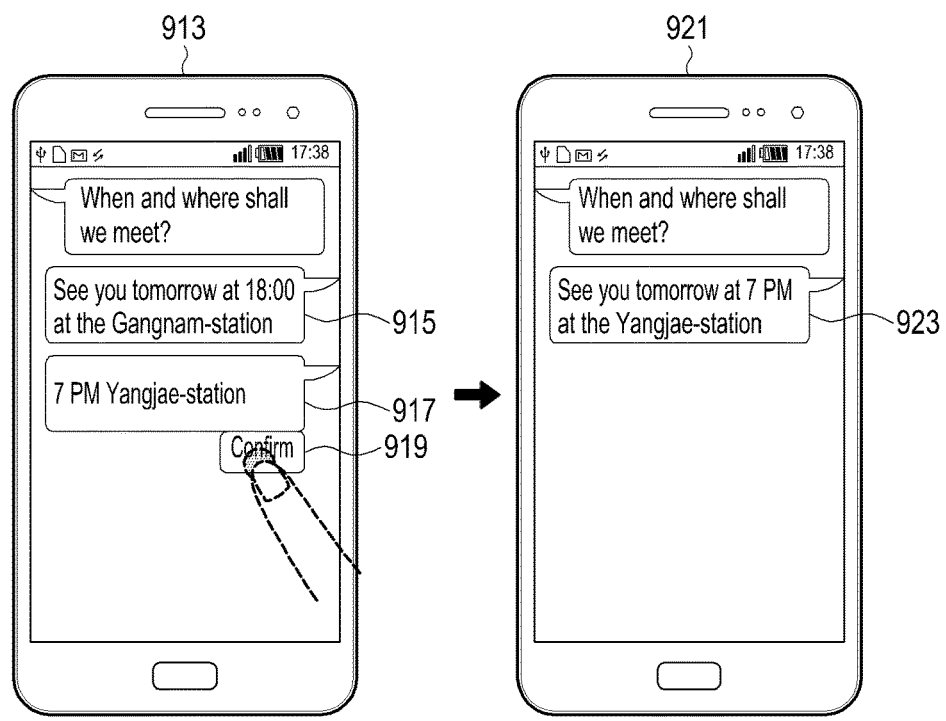

FIGS. 9A and 9B illustrate processes of erasing an original message in a portable terminal according to an embodiment of the present disclosure.

Referring to FIGS. 9A and 9B, the portable terminal erases the original message according to predetermined message erasing methods, when receiving from a user a request for erasing the original message.

More specifically, as displayed on a screen 901, the portable terminal displays an original message 903, a first changed message 905, and a bubble 907 for requesting erasing of the original message 903, according to a first displaying method among message displaying methods.

When the user touches the bubble 907, the portable terminal erases, as displayed on a screen 909, the original message 903 according to a first erasing method among the predetermined message erasing methods, and maintains the first changed message 911 as it is. For example, when the original message is 'See you tomorrow at 18:00 at the Gangnam-station' and the first changed message is 'See you tomorrow at 7 PM at the Yangjae-station', the portable terminal erases the original message and leaves only the first changed message.

As displayed on a screen 913, the portable terminal displays an original message 915, a second changed message 917, and a bubble 919 for requesting erasing of the original message 915, according to a second displaying method among the message displaying methods.

When the user touches the bubble 919, the portable terminal erases, as displayed on a screen 921, the original message 915 according to a second erasing method among the predetermined message erasing methods, reflects the second changed message 917 in the original message 915 to generate a new third changed message 923, and displays the generated third changed message 923. For example, when the original message is 'See you tomorrow at 18:00 at the Gangnam-station' and the second changed message is '7 PM Yangjae-station', the portable terminal may erase the original message, and may reflect the second changed message in the original message to generate and display the third changed message 'See you tomorrow at 7 PM at the Yangjae-station'.

Figure 10:
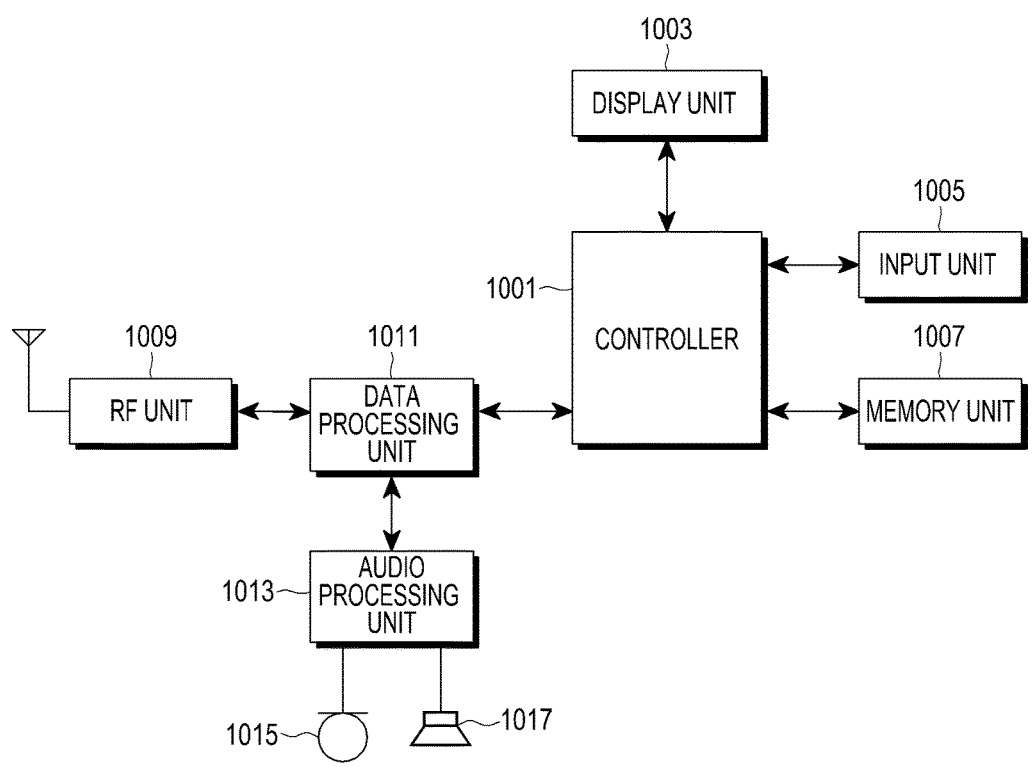
FIG. 10 is a block diagram illustrating a portable terminal according to an embodiment of the present disclosure.

FIG. 10 is block diagram illustrating a portable terminal according to an embodiment of the present disclosure.

Referring to FIG. 10, the portable terminal includes a controller 1001, a display unit 1003, an input unit 1005, a memory unit 1007, a Radio Frequency (RF) unit 1009, a data processing unit 1011, and an audio processing unit 1013.

The RF unit 1009 performs a wireless communication function of the portable terminal. More specifically, the RF unit 1009 includes a wireless transmitter that up-converts and amplifies a frequency of a transmitted signal, and a wireless receiver that low-noise amplifies a received signal and down-converts a frequency of the received signal. The data processing unit 1011 includes a transmitter that encodes and modulates a transmitted signal, and a receiver that demodulates and decodes a received signal. The data processing unit 1011 may be configured with a modem and a codec, and a codec may include a data codec that processes packet data, and an audio codec that processes an audio signal such as a voice.

The audio processing unit 1013 plays a reception audio signal, output from the data processing unit 1011, through a speaker 1015, and transmits a transmission audio signal, caused by a microphone 1017, to the data processing unit 1011. The input unit 1005 includes keys for inputting number and character information, and function keys for setting a variety of functions. The display unit 1003 displays an image signal on a screen, and displays data requested to be output by the controller 1001.

When the display unit 1003 is implemented with an electrostatic or pressure sensitive type touch display screen, the input unit 1005 may include only at least keys set in advance, and the display unit 1003 may replace some of key-input functions of the input unit 1005. The memory unit 1007 includes a program memory and a data memory. The program memory stores a booting and operating system (hereinafter, referred to as 'OS') for controlling general operations of the portable terminal, and the data memory stores various data generated during the operations of the portable terminal.

The controller 1001 controls an overall operation of the portable terminal. More particularly, the controller 1001 may easily edit content such as an electronic document or a text message, including characters.

More specifically, the controller 1001 displays an electronic document requested by a user. When the user executes a specific application having an editing function for editing an electronic document, and selects any one of a plurality of electronic documents stored in advance, the controller 1001 displays the selected electronic document. For example, the controller 1001 may display the electronic document, as displayed on the screen 101 of FIG. 1.

The controller 1001 determines whether the user requests editing of the electronic document. At this time, the controller 1001 determines whether the user selects a virtual key 103 to request the editing of the electronic document. The virtual key 103 is located at a predetermined area on a screen, and when the user touches the virtual key 103, the controller 1001 determines that the user has requested the editing of the electronic document.

When it is determined that the user has requested the editing of the electronic document, the controller 1001 displays an editing window on the screen. The editing window implies a window for receiving an input of at least one character from the user. For example, the controller 1001 may display an editing window 107 as displayed on the screen 105 of FIG. 1.

The controller 1001 determines whether the user inputs at least one character in the editing window.

When it is determined that the user has input the at least one character, the controller 1001 sequentially displays the at least one character, input by the user, in the editing window. At this time, the controller 1001 receives from the user an input of at least one character through a keypad, generates a word in an order of the input characters, and displays the generated word in the editing window. For example, the controller 1001 may display a word 'APPLICATION' 109 in the editing window 107 as displayed on the screen 105 of FIG. 1, when 'a', 'p', 'p', 'l', 'i', 'c', 'a', 't', 'i', 'o', and 'n' are selected through the keypad.

The controller 1001 determines whether the user requests a drag of the at least one character displayed in the editing window. When it is determined that the user has requested the drag, the controller 1001 analyzes the displayed at least one character, and determines based on the analysis result whether a specific character is included in the displayed at least one character. The specific character is a character that represents an end of a sentence. For example, the specific character may be any one of characters '!' and '?'.

When it is determined that the specific character is included in the displayed at least one character, the controller 1001 drags the whole characters displayed in the editing window. For example, in a case where a sentence 'The present disclosure is directed to providing a method of modifying existing contents to new different ones in an application using text in a touch-based mobile device.' is displayed in the editing window, the controller 1001 may drag the sentence.

The controller 1001 determines whether the whole characters being dragged escape from the editing window. At this time, the controller 1001 calculates X and Y coordinates for a location of a touch on the whole characters being dragged, and determines based on the calculated X and Y coordinates whether the whole characters being dragged escape from the editing window. When it is determined that the whole characters being dragged are released from the editing window, the controller 1001 changes from a display mode for displaying an electronic document to an editing mode for editing the electronic document. At this time, as displayed on the screen 311 of FIG. 3, the controller 1001 displays, with a specific color, a sentence existing at a location of the whole characters being dragged, among one or more sentences included in the electronic document, so that the user may recognize a changeable sentence.

The controller 1001 determines whether the whole characters are dragged and dropped. When it is determined that the whole characters have been dragged and dropped, the controller 1001 changes, with the whole dragged characters, a specific sentence existing at a location where the drag is completed, among one or more sentences included in the electronic document, and terminates the editing mode of the electronic document.

For example, when a touch on the whole characters being dragged is released while the whole characters 'The present disclosure is directed to providing a method of modifying existing contents to new different ones in an application using text in a touch-based mobile device.' is located on a sentence 'The present disclosure is to provide a method of modifying a typing error when the typing error is made in a text-based application, such as IM, SMS, Memo, etc., in a touch-based mobile device.', the controller 1001 may change the sentence 'The present disclosure is to provide a method of modifying a typing error when the typing error is made in a text-based application, such as IM, SMS, Memo, etc., in a touch-based mobile device.' with the whole characters 'The present disclosure is directed to providing a method of modifying existing contents to new different ones in an application using text in a touch-based mobile device.', as displayed on the screen 317 of FIG. 3.

When it is determined that the specific character is not included in the at least one displayed character, the controller 1001 drags a word including at least one character for which the user has requested the drag, among the whole characters displayed in the editing window. For example, when a word 'APPLICATION' is displayed in the editing window, the controller 1001 may drag the word.

The controller 1001 determines whether the word being dragged is released from the editing window. At this time, the controller 1001 calculates X and Y coordinates for a location of a touch on the word being dragged, and determines based on the calculated X and Y coordinates whether the word being dragged is released from the editing window. When it is determined that the word being dragged is released from the editing window, the controller 1001 changes from a display mode for displaying an electronic document to an editing mode for editing the electronic document. At this time, as displayed on the screen 111 of FIG. 1, the controller 1001 displays, with a specific color, a specific word existing at a location of the word being dragged, among one or more words included in the electronic document, so that the user may recognize a changeable word.

The controller 1001 determines whether the word is dragged and dropped. When it is determined that the word has been dragged and dropped, the controller 1001 changes, with the dragged word, a specific word existing at a location where the drag is completed, among one or more words included in the electronic document. For example, when a touch on the word 'APPLICATION' being dragged is released while the word 'APPLICATION' is located on the word 'application' 117, the controller 1001 may change the word 'application' 117 with the word 'APPLICATION', as displayed on the screen 115 of FIG. 1.

The controller 1001 determines whether a specific word exists in the electronic document. When it is determined that the specific word does not exist in the electronic document, the controller 1001 terminates the editing mode of the electronic document. On the other hand, when it is determined that the specific word exists in the electronic document, the controller 1001 displays a message for inquiring as to whether the dragged word is to be applied to the whole electronic document. For example, as displayed on the screen 205 of FIG. 2, when the same specific words exist in the electronic document, the controller 1001 may display a pop-up window 207 including the text 'Apply to the whole electronic document?', which is a message inquiring as to whether all the specific words in the electronic document are to be changed with the input word 113, and words 'Yes' and 'No' for a user determination.

The controller 1001 determines whether the user makes a request for applying the change to the whole electronic document. For example, the controller 1001 determines that the user makes the request for applying the change to the whole electronic document, when the user touches 'Yes' in the pop-up window 207 including the text 'Apply to the whole electronic document?' and the words 'Yes' and 'No', and determines that the user refuses to apply the change to the whole electronic document, when the user touches 'No' in the pop-up window 207. When it is determined that the user has refused to apply the change to the whole electronic document, the controller 1001 terminates the editing mode of the electronic document.

On the other hand, when the user makes the request for applying the change to the whole electronic document, the controller 1001 changes all the specific words included in the electronic document with the dragged word, and then terminates the editing mode of the electronic document. For example, when the specific word is 'application' and the dragged word is 'APPLICATION', the controller 1001 may change all the words 'application' with 'APPLICATION'.

When no character is input to the editing window, the controller 1001 determines whether a drag of a blank field in the editing window is requested. For example, as displayed on the screen 405 of FIG. 4, the controller 1001 may determine whether the drag of the blank field 409 in the editing window 407 is requested.

When it is determined that the drag of the blank field has been requested, the controller 1001 determines that the user has requested erasing of a character included in the electronic document, and drags an empty area having a predetermined size. The controller 1001 determines whether the empty area being dragged is released from the editing window. At this time, the controller 1001 calculates X and Y coordinates for a location of a touch on the empty area being dragged, and determines based on the calculated X and Y coordinates whether the empty area being dragged is released from the editing window.

When it is determined that the empty area being dragged is released from the editing window, the controller 1001 changes from a display mode for displaying the electronic document to an editing mode for editing the electronic document. At this time, as displayed on the screen 411 of FIG. 4, the controller 1001 displays, with a specific color, a word existing at a location of the empty area being dragged in the at least one sentence included in the electronic document, so that the user may recognize an erasable word.

The controller 1001 determines whether the empty area is dragged and dropped. When it is determined that the empty area has been dragged and dropped, the controller 1001 erases a specific word existing at a location where the drag is completed, among one or more words included in the electronic document. For example, when a touch on the empty area 413 is released while the empty area 413 is on a word 'SMS', the controller 1001 may erase the word 'SMS' as displayed on the screen 415.

Meanwhile, the controller 1001 display a text message that a user requests. At this time, the user executes a specific application having functions for writing and transmitting/receiving a text message, and the controller 1001 displays a text message, including characters input by the user, through the specific application and transmits the displayed text message according to a user request for transmission. The specific application may be an application providing a Kakao Talk service, a Mypeople service, or a basic message service that the portable terminal provides. For example, as displayed on the screen 601 of FIG. 6A, the controller 1001 may display a text message.

The controller 1001 determines whether a user requests editing of a text message. At this time, the controller 1001 determines whether the user selects a virtual key 103 that requests the editing of the text message. The virtual key 103 is located at a predetermined area on the screen, and when the user touches the virtual key 103, the controller 1001 determines that the user has requested the editing of the text message.

When it is determined that the user has requested the editing of the text message, the controller 1001 displays an editing window on a screen. The editing window implies a window for receiving an input of at least one character from the user. For example, as displayed on the screen 601 of FIG. 6A, the controller 1001 may display an editing window 603. The controller 1001 determines whether the user inputs at least one character in the editing window.

When it is determined that the user has input the at least one character, the controller 1001 sequentially displays the at least one character input by the user in the editing window. At this time, the controller 1001 receives an input of the at least one character from the user through a keypad, generates a word in an order of the input characters, and displays the generated word in the editing window. For example, when 'Y', 'a', 'n', 'g', 'j', 'a', 'e', 's', 't', 'a', 't', 'i', 'o', 'n', '7', 'P', and 'M' are selected from the keypad, the controller 1001 may display a word 605 'Yangjae-station 7 PM' in the editing window 603 as displayed on the screen 601 of FIG. 6A.

The controller 1001 determines whether the user requests a drag of the at least one character displayed in the editing window. When it is determined that the user has requested the drag, the controller 1001 drags a word including the at least one character for which the user has requested the drag, among the whole characters displayed in the editing window. For example, when the user requests a drag of a word 'Yangjae-station' of two words 'Yangjae-station' and '7 PM' displayed in the editing window, the controller 1001 may drag the word 'Yangjae-station'.

The controller 1001 determines whether the word being dragged is released from the editing window. At this time, the controller 1001 calculates X and Y coordinates for a location of a touch on the word being dragged, and determines based on the calculated X and Y coordinates whether the word being dragged is released from the editing window.

When it is determined that the word being dragged is released from the editing window, the controller 1001 changes from a display mode for displaying a text message to an editing mode for editing the text message. At this time, as displayed on the screen 611 of FIG. 6A, the controller 1001 displays, with a specific color, a specific word existing at a location of the word being dragged among one or more words included in the text message, so that the user may recognize a changeable word.

The controller 1001 determines whether the word is dragged and dropped. When it is determined that the word is dragged and dropped, the controller 1001 changes, with the dragged word, a specific word existing at a location where the drag is completed among the one or more words included in the text message, displays a message inquiring the user as to whether the changed text message is to be sent, and terminates the editing mode of the text message. For example, when a touch on a word 'Yangjae-station' 613 being dragged is released while the word 'Yangjae-station' 613 is located on a word 'Gangnam-station 614', the controller 1001 may change the word 'Gangnam-station' 614 with the word 'Yangjae-station' 613, and may display a bubble 619 for inquiring the user as to whether the changed text message 617 is to be sent, as displayed on the screen 615 of FIG. 6A.

When it is determined that no character has been input to the editing window, the controller 1001 determines whether the user requests a drag of a blank field in the editing window. When it is determined that the drag of the blank field has been requested, the controller 1001 determines that the user has requested erasing of a character included in the text message, and drags an empty area having a predetermined size.

The controller 1001 determines whether the empty area being dragged is released from the editing window. At this time, the controller 1001 calculates X and Y coordinates for a location of a touch on the empty area being dragged, and determines based on the calculated X and Y coordinates whether the empty area being dragged is released from the editing window.

When it is determined that the empty area being dragged is released from the editing window, the controller 1001 changes from a display mode for displaying a text message to an editing mode for editing the text message. The controller 1001 determines whether the empty area is dragged and dropped. When it is determined that the empty area is dragged and dropped, the controller 1001 erases a specific word existing at a location where the drag is completed among the one or more words included in the text message, displays a pop-up window inquiring the user as to whether the changed text message is to be sent, and then terminates the editing mode of the text message.

The controller 1001 determines whether the user requests transmission of the changed text message. For example, when a bubble 619 illustrated in FIG. 6A, inquiring as to whether the changed text message is to be sent, is touched, the controller 1001 determines that the user has requested the transmission of the changed text message.

When it is determined that the user has requested the transmission of the text message, the controller 1001 displays the original message and the changed message according to predetermined message displaying methods, and displays a pop-up window inquiring the user as to whether the original message is to be erased. The predetermined message displaying methods imply methods of displaying the original message and the changed message, and include a first displaying method and a second displaying method.

More specifically, when displaying the original message and the changed message through the first displaying method among the predetermined message displaying methods, the controller 1001 displays, with different colors, the original message 803 and the first changed message 805 in which at least one specific word included in the original message is changed, as displayed on the screen 801 of FIG. 8A. For example, the controller 1001 may display an original message 803 'See you tomorrow at 18:00 at the Gangnam-station' with in black, and a first changed message 805 'See you tomorrow at 7 PM at the Yangjae-station' with a red color.

Alternatively, controller 1001 may display the original message 803 with a specific color, and the first changed message 805 with another specific color that is the same as but lighter than that of the original message. For example, the controller 1001 may display the original message 803 'See you tomorrow at 18:00 at the Gangnam-station' in a dark red, and the first changed message 805 'See you tomorrow at 7 PM at the Yangjae-station' with a red color lighter than the dark red.

When displaying the original message and the changed message through the second displaying method among the predetermined message displaying methods, the controller 1001 displays an original message 809 and a second changed message 811 including only at least one changed word, as displayed on the screen 807 of FIG. 8B. At this time, the controller 1001 arranges the at least one changed word, included in the second changed message 811, at the same location as that of at least one original word included in the original message 809. For example, when the original message 809 is 'See you tomorrow at 18:00 at the Gangnam-station' and the changed words are '7 PM' and 'Yangjae-station', the controller 1001 may display the second changed message 811 '7 PM Yangjae-station'.

The controller 1001 determines whether the user requests erasing of the original message. For example, as displayed on the screen 901 of FIG. 9A, when the user touches a bubble 919 for inquiring as to whether the original message is to be erased, the controller 1001 may determine that the erasing of the original message has been requested.

When it is determined that the erasing of the original message has been requested, the controller 1001 erases the original message according to predetermined message erasing methods, and displays the changed message. The predetermined message erasing methods imply methods of erasing the original message, and include a first erasing method and a second erasing method.

More specifically, as displayed on the screen 901 of FIG. 9A, the controller 1001 displays an original message 903, a first changed message 905, and a bubble 907 for requesting the erasing of the original message 903, according to the first displaying method among the message displaying methods.

When the user touches the bubble 907, the controller 1001 erases, as displayed on the screen 909, the original message 903 according to the first erasing method among the predetermined message erasing methods, and maintains the first changed message 911 as it is. For example, when the original message 903 is 'See you tomorrow at 18:00 at the Gangnam-station' and the first changed message 911 is 'See you tomorrow at 7 PM at the Yangjae-station', the controller 1001 erases the original message 903 and leaves only the first changed message 911.

As displayed on the screen 913, the controller 1001 displays an original message 915, a second changed message 917, and a bubble 919 for requesting the erasing of the original message 915, according to the second displaying method among the message displaying methods.

When the user touches the bubble 919, the controller 1001 erases, as displayed on the screen 921, the original message 915 according to the second erasing method among the predetermined message erasing methods, reflects the second changed message 917 in the original message 915 to generate a new third changed message 923, and displays the generated third changed message 923. For example, when the original message 915 is 'See you tomorrow at 18:00 at the Gangnam-station' and the second changed message is '7 PM Yangjae-station', the controller 1001 may erase the original message 915, and may reflect the second changed message 917 in the original message 915 to generate and display the third changed message 923 'See you tomorrow at 7 PM at the Yangjae-station'.

Figure 11A:
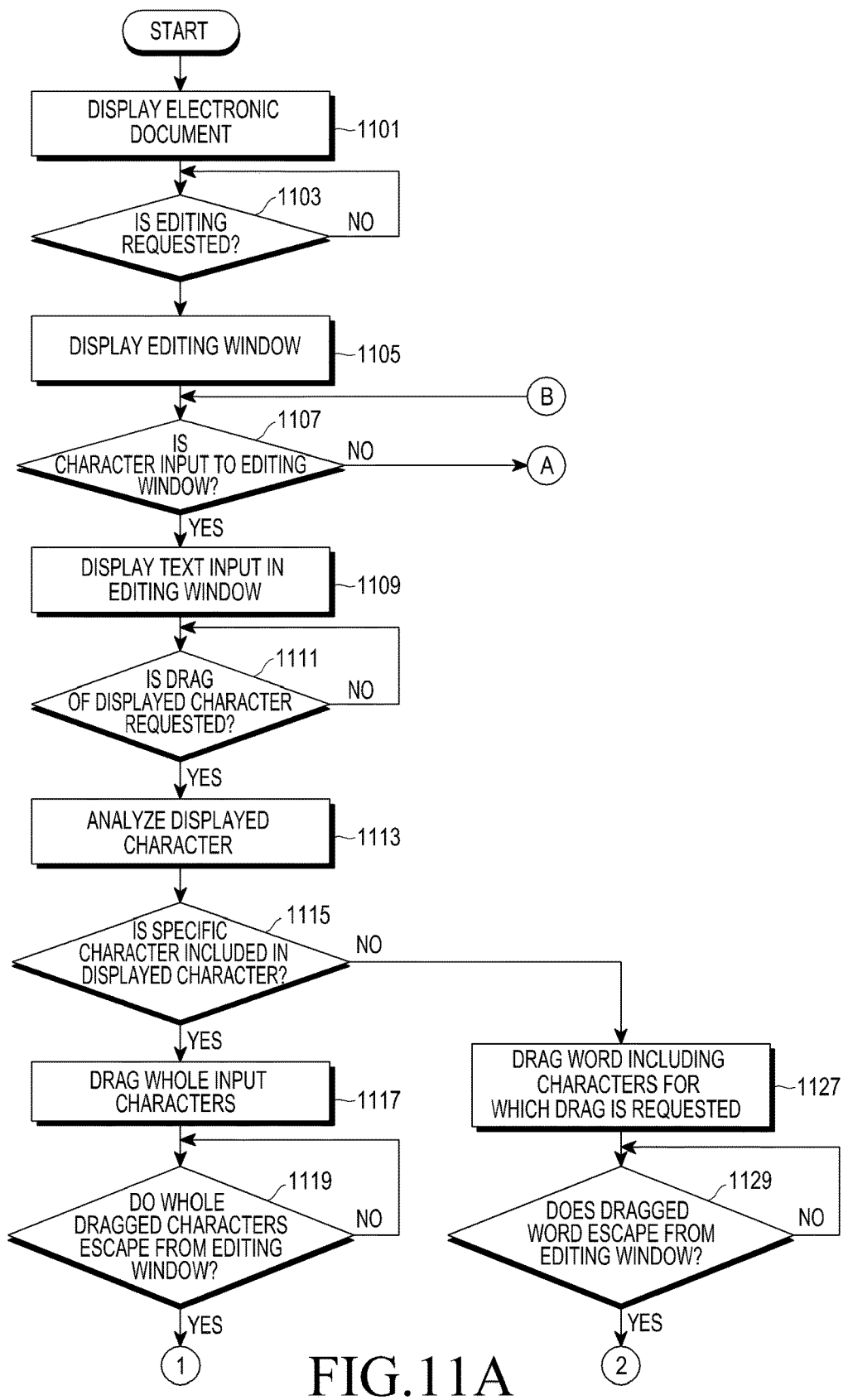
FIGS. 11A, 11B, and 11C are flowcharts illustrating a process of editing an electronic document in a portable terminal according to an embodiment of the present disclosure.
Figure 11B:
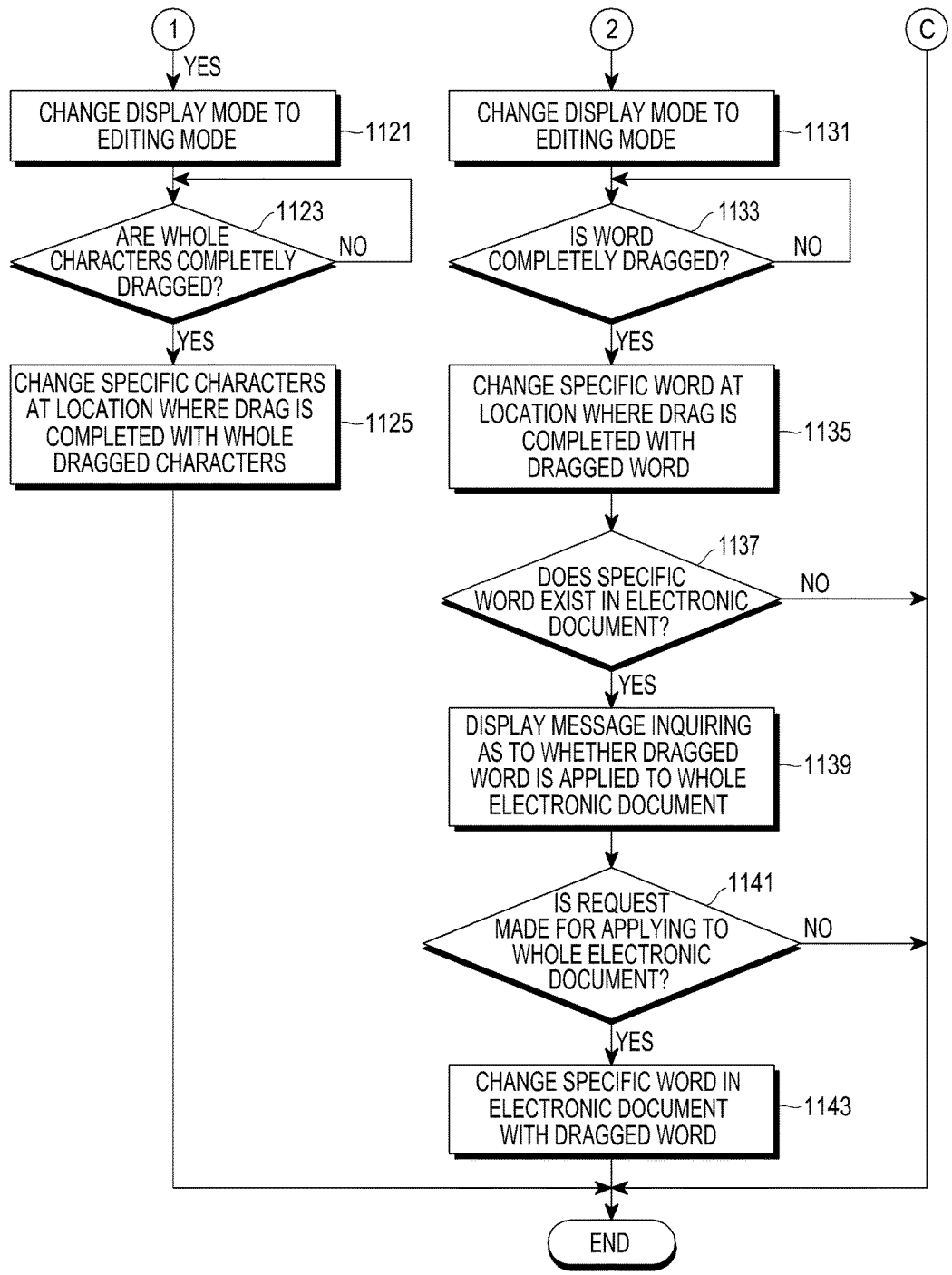
Figure 11C:
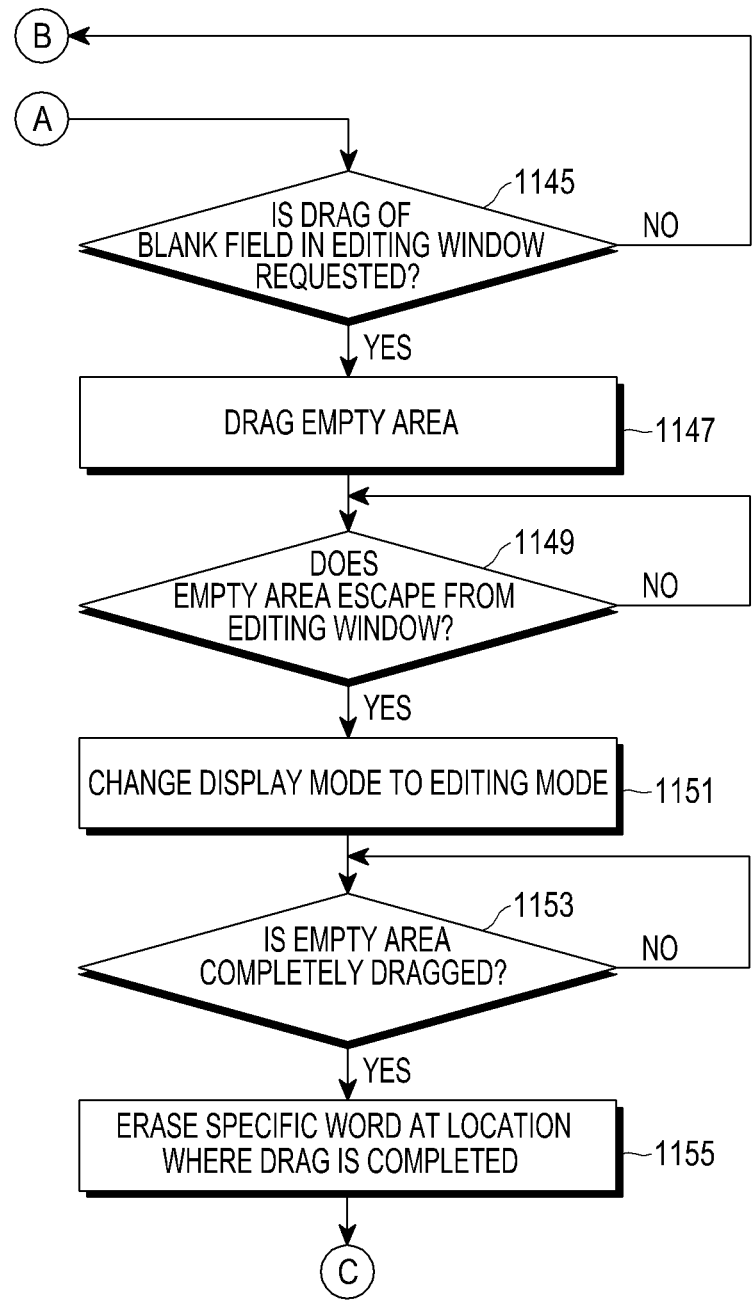

FIGS. 11A to 11C are a flowchart illustrating a process of editing an electronic document in a portable terminal according to an embodiment of the present disclosure.

Referring to FIGS. 11A to 11C, in operation 1101, a controller 1001 displays an electronic document requested by a user, and proceeds to operation 1103. When the user executes a specific application having an electronic document editing mode, and selects any one of a plurality of electronic documents stored in advance, the controller 1001 displays the selected electronic document. For example, the controller 1001 may display the electronic document, as displayed on the screen 101 of FIG. 1.

In operation 1103, the controller 1001 determines whether the user requests editing of the electronic document. At this time, the controller 1001 determines whether the user selects a virtual key 103 to request the editing of the electronic document. The virtual key 103 is located at a predetermined area on a screen, and when the user touches the virtual key 103, the controller 1001 determines that the user has requested the editing of the electronic document.

When it is determined that the user has requested the editing of the electronic document, the controller 1001 proceeds to operation 1105, and when it is determined that the user has not requested the editing of the electronic document ('NO'), the controller 1001 repeatedly performs operation 1103.

When proceeding to operation 1105, the controller 1001 displays an editing window on the screen, and proceeds to operation 1107. The editing window implies a window for receiving an input of at least one character from the user. For example, the controller 1001 may display an editing window 107 as displayed on the screen 105 of FIG. 1.

In operation 1107, the controller 1001 determines whether the user inputs at least one character in the editing window. When it is determined that the user has input the at least one character ('YES'), the controller 1001 proceeds to operation 1109, and when it is determined that the user has not input the at least one character ('NO'), the controller 1001 proceeds to operation 1145 via connector (A).

When proceeding to operation 1109, the controller 1001 sequentially displays, in the editing window, the at least one character input by the user, and then proceeds to operation 1111. At this time, the controller 1001 receives from the user an input of at least one character through a keypad, generates a word in an order of the input characters, and displays the generated word in the editing window. For example, the controller 1001 may display a word 'APPLICATION' 109 in the editing window 107 as displayed on the screen 105 of FIG. 1, when 'a', 'p', 'p', 'l', 'i', 'c', 'a', 't', 'i', 'o', and 'n' are selected through the keypad.

In operation 1111, the controller 1001 determines whether the user requests a drag of the at least one character displayed in the editing window ('YES'). When it is determined that the user has requested the drag, the controller 1001 proceeds to operation 1113, and when it is determined that the user has not requested the drag, the controller 1001 repeatedly performs operation 1111 ('NO'). When proceeding to operation 1113, the controller 1001 analyzes the displayed at least one character, and in operation 1115, determines whether a specific character is included in the displayed at least one character, based on the analysis result ('YES'). The specific character is a character that represents an end of a sentence. For example, the specific character may be any one of characters '!' and '?'. When it is determined that the specific character is included in the displayed at least one character, the controller 1001 proceeds to operation 1117, and when it is determined that the specific character is not included in the displayed at least one character ('NO'), the controller 1001 proceeds to operation 1127.

When proceeding to operation 1117, the controller 1001 drags the whole characters displayed in the editing window, and then proceeds to operation 1119. For example, in a case where a sentence 'The present disclosure is directed to providing a method of modifying existing contents to new different ones in an application, such as IM, SMS, Memo, etc., using text in a touch-based mobile device.' is displayed in the editing window, the controller 1001 may drag the sentence.

In operation 1119, the controller 1001 determines whether the whole characters being dragged escape from the editing window ('YES'). At this time, the controller 1001 calculates X and Y coordinates for a location of a touch on the whole characters being dragged, and determines based on the calculated X and Y coordinates whether the whole characters being dragged escape from the editing window. When it is determined that the whole characters being dragged are released from the editing window, the controller 1001 proceeds to operation 1121 via connector (1), and when it is determined that the whole characters being dragged have not been released from the editing window ('NO'), the controller 1001 repeatedly performs operation 1119.

When proceeding to operation 1121, the controller 1001 changes from a display mode for displaying an electronic document to an editing mode for editing the electronic document, and proceeds to operation 1123. At this time, as displayed on the screen 311 of FIG. 3, the controller 1001 displays, with a specific color, a sentence existing at a location of the whole characters being dragged, among one or more sentences included in the electronic document, so that the user may recognize a changeable sentence.

In operation 1123, the controller 1001 determines whether the whole characters are completely dragged. Namely, the controller 1001 determines whether the whole characters are dragged and dropped. When it is determined that the whole characters have been dragged and dropped ('YES'), the controller 1001 proceeds to operation 1125, and when it is determined that the whole characters have not been dragged and dropped ('NO'), the controller 1001 repeatedly performs operation 1123. When proceeding to operation 1125, the controller 1001 changes, with the whole dragged characters, a specific sentence existing at a location where the drag is completed, among one or more sentences included in the electronic document, and terminates the editing mode of the electronic document.

For example, when a touch on the whole characters being dragged is released while the whole characters 'The present disclosure is directed to providing a method of modifying existing contents to new different ones in an application using text in a touch-based mobile device.' is located on a sentence 'The present disclosure is to provide a method of modifying a typing error when the typing error is made in a text-based application, such as IM, SMS, Memo, etc., in a touch-based mobile device.', the controller 1001 may change the sentence 'The present disclosure is to provide a method of modifying a typing error when the typing error is made in a text-based application, such as IM, SMS, Memo, etc., in a touch-based mobile device.' with the whole characters 'The present disclosure is directed to providing a method of modifying existing contents to new different ones in an application using text in a touch-based mobile device.', as displayed on the screen 317 of FIG. 3.

When proceeding to operation 1127, the controller 1001 drags a word including at least one character for which the user has requested the drag, among the whole characters displayed in the editing window, and then proceeds to operation 1129. For example, when a word 'APPLICATION' is displayed in the editing window, the controller 1001 may drag the word.

In operation 1129, the controller 1001 determines whether the word being dragged is released from the editing window. At this time, the controller 1001 calculates X and Y coordinates for a location of a touch on the word being dragged, and determines based on the calculated X and Y coordinates whether the word being dragged escapes from the editing window. When it is determined that the word being dragged is released from the editing window ('YES'), the controller 1001 proceeds to operation 1131 via connector (2), and when it is determined that the word being dragged has not been released from the editing window ('NO'), the controller 1001 repeatedly performs operation 1129.

When proceeding to operation 1131, the controller 1001 changes from a display mode for displaying an electronic document to an editing mode for editing the electronic document, and proceeds to operation 1133. At this time, as displayed on the screen 111 of FIG. 1, the controller 1001 displays, with a specific color, a specific word existing at a location of the word being dragged, among one or more words included in the electronic document, so that the user may recognize a changeable word.

In operation 1133, the controller 1001 determines whether the word is completely dragged. Namely, the controller 1001 determines whether the word is dragged and dropped. When it is determined that the word has been dragged and dropped ('YES'), the controller 1001 proceeds to operation 1135, and when it is determined that the word has not been dragged and dropped ('NO'), the controller 1001 repeatedly performs operation 1133. When proceeding to operation 1135, the controller 1001 changes, with the dragged word, a specific word existing at a location where the drag is completed, among one or more words included in the electronic document, and proceeds to operation 1137. For example, when a touch on the word 'APPLICATION' being dragged is released while the word 'APPLICATION' is located on the word 'application', the controller 1001 may change the word 'application' with the word 'APPLICATION', as displayed on the screen 115 of FIG. 1.

In operation 1137, the controller 1001 determines whether a specific word exists in the electronic document. When it is determined that the specific word exists in the electronic document ('YES'), the controller 1001 proceeds to operation 1139, and when it is determined that the specific word does not exist in the electronic document ('NO'), the controller 1001 terminates the editing mode of the electronic document. When proceeding to operation 1139, the controller 1001 displays a message for inquiring as to whether the dragged word is applied to the whole electronic document, and then proceeds to operation 1141. For example, as displayed on the screen 205 of FIG. 2, when the same specific words exist in the electronic document, the controller 1101 may display a pop-up window 207 including the text 'Apply to the whole electronic document?', which is a message inquiring as to whether all the specific words in the electronic document are to be changed with the input word 113, and words 'Yes' and 'No' for a user determination.

In operation 1141, the controller 1001 determines whether the user makes a request for applying the change to the whole electronic document. For example, the controller 1001 determines that the user makes the request for applying the change to the whole electronic document, when the user touches 'Yes' in the pop-up window 207 including the text 'Apply to the whole electronic document?' and the words 'Yes' and 'No', and determines that the user refuses to apply the change to the whole electronic document, when the user touches 'No' in the pop-up window 207. When it is determined that the user has made the request for applying the change to the whole electronic document ('YES'), the controller 1001 proceeds to operation 1143, and when it is determined that the user has refused to apply the change to the whole electronic document ('NO'), the controller 1001 terminates the editing mode of the electronic document.

When proceeding to operation 1143, the controller 1001 changes all the specific words included in the electronic document with the dragged word, and then terminates the editing mode of the electronic document. For example, when the specific word is 'application' and the dragged word is 'APPLICATION', the controller 1001 may change all the words 'application' with 'APPLICATION'.

When proceeding to operation 1145, the controller 1001 determines whether a drag of a blank field in the editing window is requested. When it is determined that the drag of the blank field has been requested ('YES'), the controller 1001 proceeds to operation 1147, and when it is determined that the drag of the blank field has not been requested ('NO'), the controller 1001 proceeds to operation 1107. For example, as displayed on the screen 405 of FIG. 4, the controller 1001 may determine whether the drag of the blank field 409 in the editing window 407 is requested.

When proceeding to operation 1147, the controller 1001 determines that the user has requested erasing of a character included in the electronic document, drags an empty area having a predetermined size, and then proceeds to operation 1149. In operation 1149, the controller 1001 determines whether the empty area being dragged is released from the editing window. At this time, the controller 1001 calculates X and Y coordinates for a location of a touch on the empty area being dragged, and determines based on the calculated X and Y coordinates whether the empty area being dragged is released from the editing window. When it is determined that the empty area being dragged is released from the editing window ('YES'), the controller 1001 proceeds to operation 1151, and when it is determined that the empty area being dragged has not been released from the editing window ('NO'), the controller 1001 repeatedly performs operation 1149.

When proceeding to operation 1151, the controller 1001 changes from a display mode for displaying the electronic document to an editing mode for editing the electronic document, and proceeds to operation 1153. At this time, as displayed on the screen 411 of FIG. 4, the controller 1001 displays, with a specific color, a word existing at a location of the empty area being dragged in the at least one sentence included in the electronic document, so that the user may recognize an erasable word.

In operation 1153, the controller 1001 determines whether the empty area is completely dragged. Namely, the controller 1001 determines whether the empty area is dragged and dropped. When it is determined that the empty area has been dragged and dropped ('YES'), the controller 1001 proceeds to operation 1155, and when it is determined that the empty area has not been dragged and dropped ('NO'), the controller 1001 repeatedly performs operation 1153. When proceeding to 1155, the controller 1001 erases a specific word existing at a location where the drag is completed, among one or more words included in the electronic document and then ends process via connector (C). For example, when a touch on the empty area 413 is released while the empty area 413 is on a word 'touch-based', the controller 1001 may erase the word 'touch-based' as displayed on the screen 415.

Figure 12A:
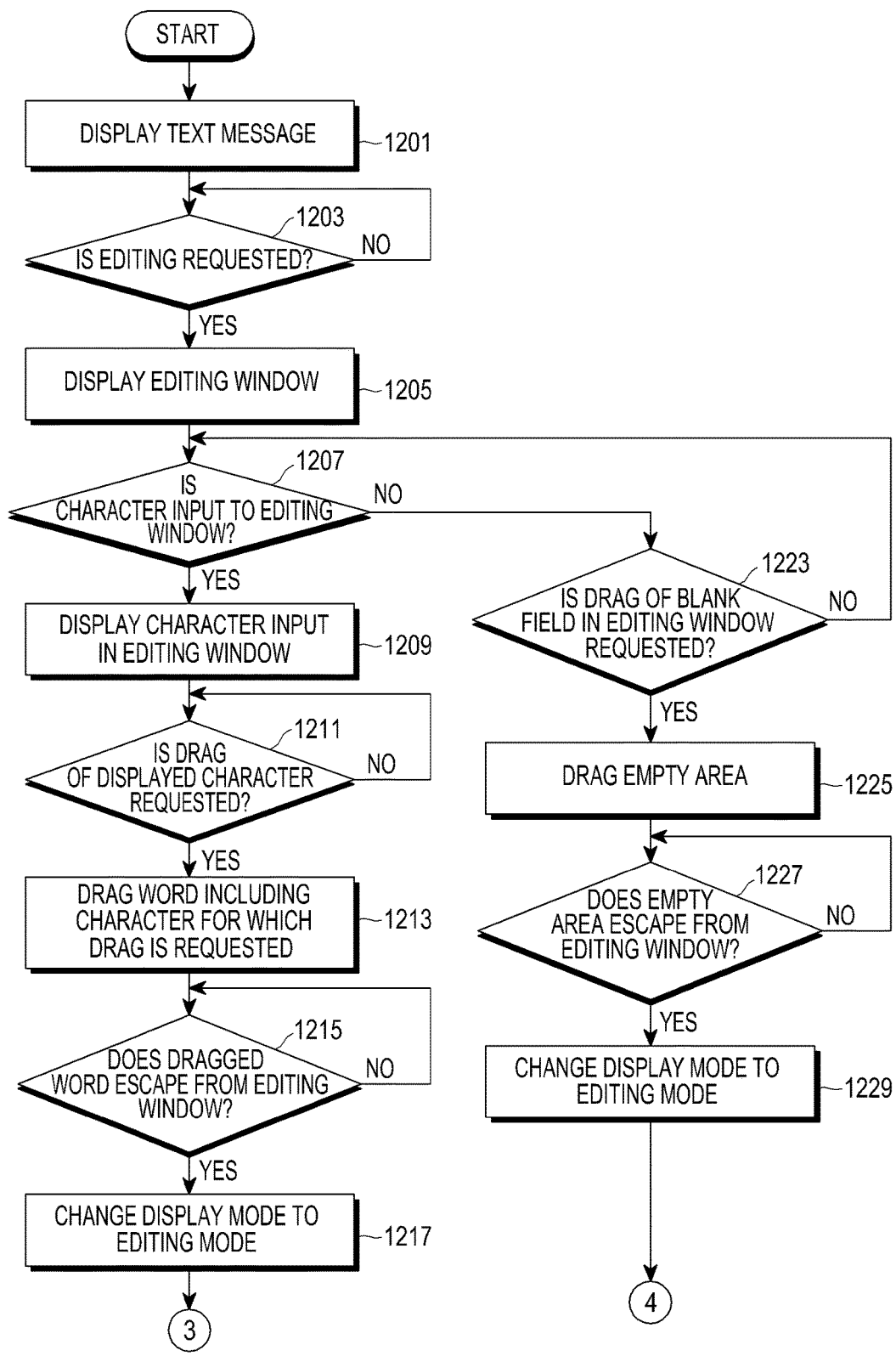
FIGS. 12A and 12B are flowcharts illustrating a process of editing a message in a portable terminal according to an embodiment of the present disclosure.
Figure 12B:
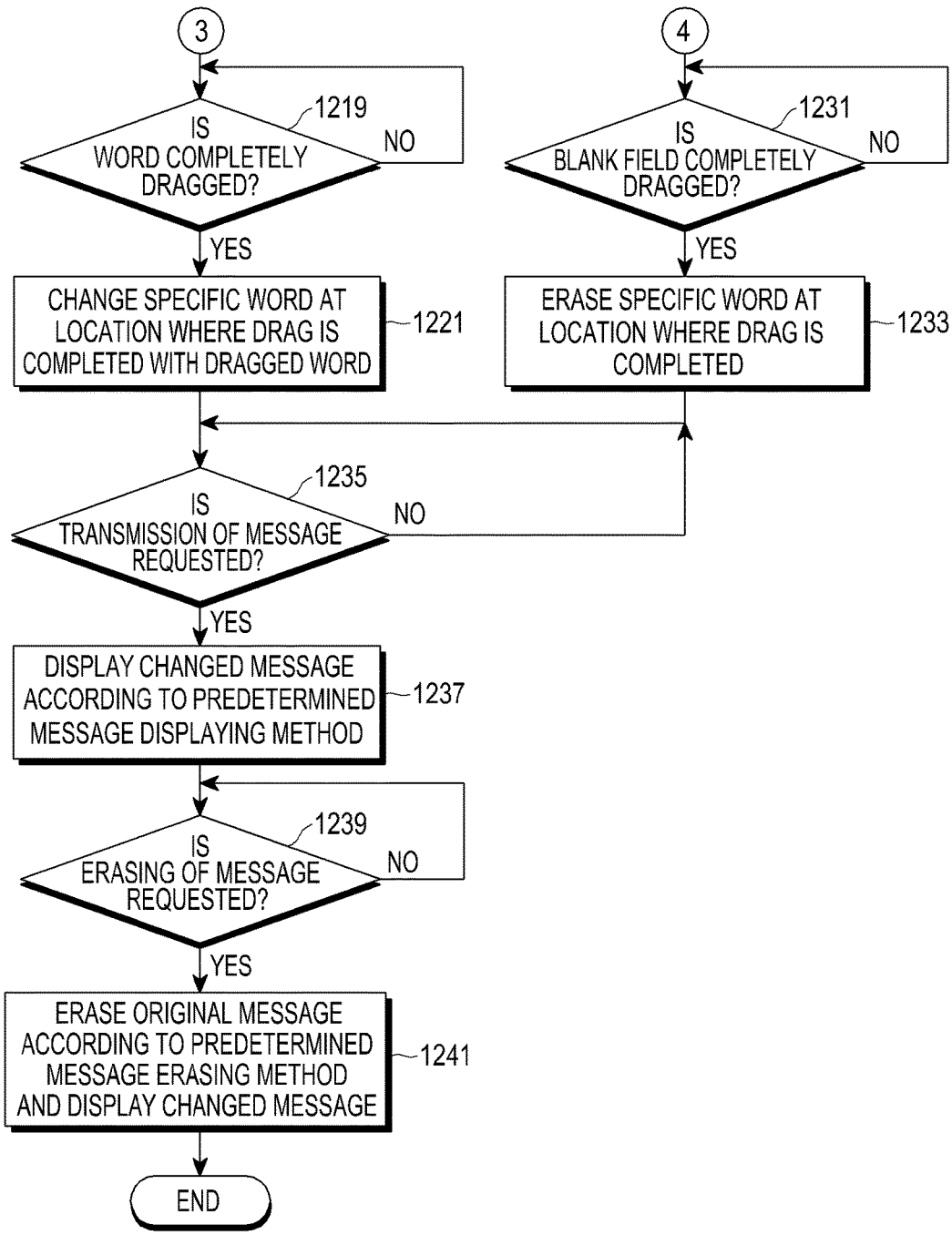

FIGS. 12A and 12B are flowcharts illustrating a process of editing a message in a portable terminal according to an embodiment of the present disclosure.

Referring to FIGS. 12A and 12B, in operation 1201, the controller 1001 displays a text message that a user requests, and then proceeds to operation 1203. At this time, the user executes a specific application having functions for writing and transmitting/receiving a text message, and the controller 1001 displays a text message, including characters input by the user, through the specific application and transmits the displayed text message according to a user request for transmission. The specific application may be an application providing a Kakao Talk service, a Mypeople service, or a basic message service that the portable terminal provides. For example, as displayed on the screen 601 of FIG. 6A, the controller 1001 may display a text message.

In operation 1203, the controller 1001 determines whether a user requests editing of a text message. At this time, the controller 1001 determines whether the user selects a virtual key 103 that requests the editing of the text message. The virtual key 103 is located at a predetermined area on the screen, and when the user touches the virtual key 103, the controller 1001 determines that the user has requested the editing of the text message.

When it is determined that the user has requested the editing of the text message ('YES'), the controller 1001 proceeds to operation 1205, and when it is determined that the user has not requested the editing of the text message ('NO'), the controller 1001 repeatedly performs operation 1203.

When proceeding to operation 1205, the controller 1001 displays an editing window on a screen, and then proceeds to operation 1207. The editing window implies a window for receiving an input of at least one character from the user. For example, as displayed on the screen 601 of FIG. 6A, the controller 1001 may display an editing window 603.

In operation 1207, the controller 1001 determines whether the user inputs at least one character in the editing window. When it is determined that the user has input the at least one character in the editing window ('YES'), the controller 1001 proceeds to operation 1209, and when it is determined that the user has not input the at least one character in the editing window ('NO'), the controller 1001 proceeds to operation 1223.

When proceeding to operation 1209, the controller 1001 sequentially displays the at least one word input by the user in the editing window, and then proceeds to operation 1211. At this time, the controller 1001 receives an input of the at least one character from the user through a keypad, generates a word in an order of the input characters, and displays the generated word in the editing window. For example 'Y', 'a', 'n', 'g', 'j', 'a', 'e', 's', 't', 'a', 't', 'i', 'o', 'n', '7', 'P', and 'M' are selected through the keypad, the controller 1001 may display a word 605 'Yangjae-station 7 PM' in the editing window 603 as displayed on the screen 601 of FIG. 6A.

In operation 1121, the controller 1001 determines whether the user requests a drag of the at least one character displayed in the editing window. When it is determined that the user has requested the drag ('YES'), the controller 1001 proceeds to operation 1213, and when it is determined that the user has not requested the drag ('NO'), the controller 1001 repeatedly performs operation 1211.

When proceeding to operation 1213, the controller 1001 drags a word including the at least one character for which the user has requested the drag, among the whole characters displayed in the editing window, and then proceeds to operation 1215. For example, when the user requests a drag of a word 'Yangjae-station' of two words 'Yangjae-station' and '7 PM' displayed in the editing window, the controller 1001 may drag the word 'Yangjae-station'.

In operation 1215, the controller 1001 determines whether the word being dragged is released from the editing window. At this time, the controller 1001 calculates X and Y coordinates for a location of a touch on the word being dragged, and determines based on the calculated X and Y coordinates whether the word being dragged is released from the editing window. When it is determined that the word being dragged is released from the editing window ('YES'), the controller 1001 proceeds to operation 1217, and when it is determined that the word being dragged has not been released from the editing window ('NO'), the controller 1001 repeatedly performs operation 1215.

When proceeding to operation 1217, the controller 1001 changes from a display mode for displaying a text message to an editing mode for editing the text message, and proceeds to operation 1219 via connector (3). At this time, as displayed on the screen 611 of FIG. 6A, the controller 1001 displays, with a specific color, a specific word existing at a location of the word being, dragged among one or more words included in the text message, so that the user may recognize a changeable word.

In operation 1219, the controller 1001 determines whether the word is completely dragged. Namely, the controller 1001 determines whether the word is dragged and dropped. When it is determined that the word is dragged and dropped ('YES'), the controller 1001 proceeds to operation 1221, and when it is determined that the word is not dragged and dropped ('NO'), the controller 1001 repeatedly performs operation 1219. When proceeding to operation 1221, the controller 1001 changes, with the dragged word, a specific word existing at a location where the drag is completed among the one or more words included in the text message, displays a message inquiring the user as to whether the changed message is sent, terminates the editing mode of the text message, and then proceeds to operation 1235. For example, when a touch on a word 'Yangjae-station' being dragged is released while the word 'Yangjae-station' 613 is located on a word 'Gangnam-station' 614, the controller 1001 may change the word 'Gangnam-station' 614 with the word 'Yangjae-station' 613, and may display a bubble 619 for inquiring the user as to whether the changed text message 617 is sent, as displayed on the screen 615 of FIG. 6A.

When proceeding to operation 1223, the controller 1001 determines whether the user requests a drag of a blank field in the editing window. When it is determined that the drag of the blank field has been requested ('YES'), the controller 1001 proceeds to operation 1225, and when it is determined that the drag of the blank field has not been requested ('NO'), the controller 1001 proceeds to operation 1207. When proceeding to operation 1225, the controller 1001 determines that the user has requested erasing of a character included in the text message, drags an empty area having a predetermined size, and then proceeds to operation 1227.

In operation 1227, the controller 1001 determines whether the empty area being dragged is released from the editing window. At this time, the controller 1001 calculates X and Y coordinates for a location of a touch on the empty area being dragged, and determines based on the calculated X and Y coordinates whether the empty area being dragged is released from the editing window. When it is determined that the empty area being dragged has been released from the editing window ('YES'), the controller 1001 proceeds to operation 1229, and when it is determined that the empty area being dragged has not been released from the editing window ('NO'), the controller 1001 repeatedly performs operation 1227.

When proceeding to operation 1229, the controller 1001 changes from a display mode for displaying a text message to an editing mode for editing the text message, and proceeds to operation 1231 via connector (4). In operation 1231, the controller 1001 determines whether the empty area is completely dragged. Namely, the controller 1001 determines whether the empty area is dragged and dropped. When it is determined that the empty area is dragged and dropped ('YES'), the controller 1001 proceeds to operation 1233, and when it is determined that the empty area is not dragged and dropped ('NO'), the controller 1001 repeatedly performs operation 1231. When proceeding to operation 1233, the controller 1001 erases a specific word existing at a location where the drag is completed among the one or more words included in the text message, displays a pop-up window inquiring the user as to whether the changed text message is to be sent, terminates the editing mode of the text message, and then proceeds to operation 1235

In operation 1235, the controller 1001 determines whether the user requests transmission of the changed text message. For example, when a bubble 619 illustrated in FIG. 6A, inquiring as to whether the changed text message is to be sent, is touched, the controller 1001 determines that the user has requested the transmission of the changed text message. When it is determined that the user has requested the transmission of the text message ('YES'), the controller 1001 proceeds to operation 1237, and when it is determined that the user has not requested the transmission of the text message ('NO'), the controller 1001 repeatedly performs operation 1235.

When proceeding to operation 1237, the controller 1001 displays the original message and the changed message according to predetermined message displaying methods, displays a pop-up window inquiring the user as to whether the original message is to be erased, and then proceeds to operation 1239. The predetermined message displaying methods imply methods of displaying the original message and the changed message, and include a first displaying method and a second displaying method.

More specifically, when displaying the original message and the changed message through the first displaying method among the predetermined message displaying methods, the controller 1001 displays, with different colors, the original message 803 and the first changed message 805 in which at least one specific word included in the original message is changed, as displayed on the screen 801 of FIG. 8. At this time, the controller 1001 may display the original message 803 in black, and the first changed message 805 in red. For example, the controller 1001 may display an original message 803 'See you tomorrow at 18:00 at the Gangnam-station' in black, and a first changed message 805 'See you tomorrow at 7 PM at the Yangjae-station' in red.

Alternatively, controller 1001 may display the original message 803 with a specific color, and the first changed message 805 with another specific color that is the same as but lighter than that of the original message. For example, the controller 1001 may display the original message 803 'See you tomorrow at 18:00 at the Gangnam-station' in dark red, and the first changed message 805 'See you tomorrow at 7 PM at the Yangjae-station' with a red lighter than the dark red.

When displaying the original message and the changed message through the second displaying method among the predetermined message displaying methods, the controller 1001 displays an original message 809 and a second changed message 811 including only at least one changed word, as displayed on the screen 807 of FIG. 8. At this time, the controller 1001 arranges the at least one changed word, included in the second changed message 811, at the same location as that of at least one original word included in the original message 809. For example, when the original message 809 is 'See you tomorrow at 18:00 at the Gangnam-station' and the changed words are '7 PM' and 'Yangjae-station', the controller 1001 may display the second changed message 811 '7 PM Yangjae-station'.

In operation 1239, the controller 1001 determines whether the user requests erasing of the original message. When it is determined that the user has requested the erasing of the original message, the controller 1001 proceeds to operation 1241 ('YES'), and when it is determined that the user has not requested the erasing of the original message ('NO'), the controller 1001 repeatedly performs operation 1239. For example, as displayed on the screen 901 of FIG. 9, when the user touches a bubble 919 for inquiring as to whether the original message is to be erased, the controller 1001 may determine that the erasing of the original message has been requested.

When proceeding to operation 1241, the controller 1001 erases the original message according to predetermined message erasing methods, and displays the changed message. The predetermined message erasing methods imply methods of erasing the original message, and include a first erasing method and a second erasing method.

More specifically, as displayed on the screen 901 of FIG. 9, the controller 1001 displays an original message 903, a first changed message 905, and a bubble 907 for requesting the erasing of the original message 903, according to the first displaying method among the message displaying methods.

When the user touches the bubble 907, the controller 1001 erases, as displayed on the screen 909, the original message 903 according to the first erasing method among the predetermined message erasing methods, and maintains the first changed message 911 as it is. For example, when the original message 903 is 'See you tomorrow at 18:00 at the Gangnam-station' and the first changed message 911 is 'See you tomorrow at 7 PM at the Yangjae-station', the controller 1001 erases the original message 903 and leaves only the first changed message 911.

As displayed on the screen 913, the controller 1001 displays an original message 915, a second changed message 917, and a bubble 919 for requesting the erasing of the original message 915, according to the second displaying method among the message displaying methods.

When the user touches the bubble 919, the controller 1001 erases, as displayed on the screen 921, the original message 915 according to the second erasing method among the predetermined message erasing methods, reflects the second changed message 917 in the original message 915 to generate a new third changed message 923, and displays the generated third changed message 923. For example, when the original message 915 is 'See you tomorrow at 18:00 at the Gangnam-station' and the second changed message is '7 PM Yangjae-station', the controller 1001 may erase the original message 915, and may reflect the second changed message 917 in the original message 915 to generate and display the third changed message 923 'See you tomorrow at 7 PM at the Yangjae-station'.

As described above, according to the embodiments of the present disclosure, text is edited through a drag function of a touch screen in a portable terminal, thereby making a user conveniently edit the text. Further, a word is changed through a drag function of a touch screen in a portable terminal, thereby making a user conveniently change the word. Furthermore, a sentence is changed through a drag function of a touch screen in a portable terminal, thereby making a user conveniently change the sentence. Moreover, a word is erased through a drag function of a touch screen in a portable terminal, thereby making a user conveniently erase the word.

The methods of editing the text in the portable terminal of the present disclosure may be implemented as a computer readable code in computer readable recording media. The computer-readable recording medium includes all the types of recording devices in which data readable by a computer system are stored. As for such a recording medium, for example, a ROM, a RAM, an optical disc, a magnetic tape, a floppy disc, a hard disc, or a non-volatile memory may be used, and a medium implemented in a type of carrier wave (for example, transmission through the Internet) may also be included in such a recording medium. In addition, the computer-readable recording medium may be stored with codes which are distributed in computer systems connected by a network such that the codes can be read and executed by a computer in a distributed method.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for editing text in a portable terminal, the device comprising:
   a display; and
   at least one processor configured to:
      display a text message on the display,
      receive a first input at a virtual key displayed on the display to request editing of the displayed text message,
      display a first display area in response to receiving a first input,
      receive an input of text,
      display the input text in the first display area in response to receiving the input of the text,
      display a corrected text message comprising an input word by replacing a specific word included in the text message located in a second display area with the input word included in the input text when the input word is completely dragged to the specific word,
      in response to receiving a second input requesting to transmit the corrected text message comprising the input word to at least one external portable terminal, transmit the corrected text message comprising the input word to the at least one external portable terminal and display the text message together with the corrected text message on the second display area, and
      erase the text message in the second display area, in response to a request for erasing of the text message in the second display area.

2. The device of claim 1, wherein the at least one processor is further configured to:
   determine a presence of a special character indicating an end of a sentence in the input text, and
   determine whether to drag the input word or to drag whole characters included in the input text based on the determination of the presence of the special character in the input text.

3. The device of claim 1, wherein the at least one processor is further configured to:
   change to the editing mode for editing the content, when a blank field of the first display area is released from the first display area while dragging the blank field to erase the specific word included in the content, and
   erase the specific word when the blank field is completely dragged to the specific word.

4. The device of claim 1, wherein the at least one processor is further configured to display the text message and the corrected text message with different colors.

5. The device of claim 1, wherein the at least one processor is further configured to:
   change to an editing mode for editing the content, when the input word is released from the first display area while dragging the input word to replace the specific word.

6. A method of editing text in a portable terminal, the method comprising:
   displaying a text message;
   receiving a first input at a virtual key to request editing of the displayed text message;
   displaying a first display area in response to receiving the first input;
   receiving an input of text;
   displaying the input text in the first display area in response to receiving the input of the text;
   displaying a corrected text message comprising an input word by replacing a specific word included in the text message located in a second display area with the input word included in the input text when the input word is completely dragged to the specific word; and
   in response to receiving a second input requesting transmitting the corrected text message comprising the input word to at least one external portable terminal, transmitting the corrective text message to the at least one external portable terminal and displaying the text message together with the corrective text message in the second display area.

7. The method of claim 6, further comprising:
   determining a presence of a special character indicating an end of a sentence in the input text, and
   determining whether to drag the input word or to drag whole characters included in the input text based on the determination of the presence of the special character in the input text.

8. The method of claim 6, further comprising:
   changing to an editing mode for editing the content, when a blank field of the first display area is released from the first display area while dragging the blank field to erase the specific word included in the content; and
   erasing the specific word when the blank field is completely dragged to the specific word.

9. The method of claim 6, wherein the displaying of the text message together with the corrected text message comprising the input text comprises:
   displaying the text message and the corrective text message with different colors.

10. The method of claim 6, further comprising:
changing to an editing mode for editing the content, when the input word is released from the first display area while dragging the input word to replace the specific word.

* * * * *